United States Patent
Webster

(10) Patent No.: US 11,929,789 B2
(45) Date of Patent: Mar. 12, 2024

(54) SYSTEMS AND METHODS FOR PROVIDING A TONE EMITTING DEVICE THAT COMMUNICATES DATA

(71) Applicant: Nicholas-Alexander LLC, Las Vegas, NV (US)

(72) Inventor: Thomas Webster, Las Vegas, NV (US)

(73) Assignee: THE TONE KNOWS, INC., Las Vegas, NV (US)

(*) Notice: Subject to any disclaimer, the term of this patent is extended or adjusted under 35 U.S.C. 154(b) by 869 days.

(21) Appl. No.: 16/026,451

(22) Filed: Jul. 3, 2018

(65) Prior Publication Data

US 2019/0013879 A1    Jan. 10, 2019

Related U.S. Application Data

(63) Continuation of application No. PCT/US2018/040540, filed on Jul. 2, 2018.
(Continued)

(51) Int. Cl.
*H04B 11/00* (2006.01)
*G06F 16/683* (2019.01)
(Continued)

(52) U.S. Cl.
CPC .......... *H04B 11/00* (2013.01); *G06F 16/683* (2019.01); *H04W 4/029* (2018.02); *G10L 19/018* (2013.01)

(58) Field of Classification Search
CPC combination set(s) only.
See application file for complete search history.

(56) References Cited

U.S. PATENT DOCUMENTS

| 6,597,890 B1 | 7/2003 | Sibecas et al. |
| 8,359,205 B2 | 1/2013 | Srinivasan et al. |

(Continued)

FOREIGN PATENT DOCUMENTS

| CN | 102835953 A | 12/2012 |
| CN | 105765950 | 7/2016 |

(Continued)

OTHER PUBLICATIONS

International Search Report and Written Opinion of the International Searching Authority, dated Oct. 2, 2018, PCT.

(Continued)

*Primary Examiner* — Daniel L Murphy
*Assistant Examiner* — Amie M Ndure
(74) *Attorney, Agent, or Firm* — Dinsmore & Shohl LLP

(57) ABSTRACT

Embodiments disclosed herein generally relate to systems and methods for communicating data with a tone-emitting device. A system for communicating an inaudible tone includes a tone-emitting device. The tone-emitting device includes a tone-emitting speaker for emitting an inaudible tone and a tone-determining computing device communicatively coupled to the tone-emitting speaker. The tone-determining computing device includes a non-transitory computer-readable medium that stores logic that, when executed by the tone-determining computing device, causes the tone-determining computing device to receive data related to a characteristic of an object, encode an inaudible tone that represents at least a portion of the data and send instructions to the tone-emitting speaker for outputting the inaudible tone.

14 Claims, 15 Drawing Sheets

Related U.S. Application Data

(60) Provisional application No. 62/529,296, filed on Jul. 6, 2017.

(51) Int. Cl.
*G10L 19/018* (2013.01)
*H04W 4/029* (2018.01)

(56) References Cited

U.S. PATENT DOCUMENTS

| | | | |
|---|---|---|---|
| 8,401,539 B2 | 3/2013 | Bell et al. | |
| 8,508,357 B2 | 8/2013 | Srinivasan et al. | |
| 8,666,528 B2 | 3/2014 | Harkness et al. | |
| 8,989,883 B2 | 3/2015 | Shah et al. | |
| 9,189,783 B2 | 11/2015 | Chowdhury et al. | |
| 9,224,096 B2 * | 12/2015 | Oppenheimer | G06N 5/02 |
| 9,412,120 B1 | 8/2016 | Bitoun | |
| 9,711,153 B2 | 7/2017 | McKenna et al. | |
| 9,736,628 B2 | 8/2017 | Jordan | |
| 9,812,137 B2 | 11/2017 | Hong et al. | |
| 10,169,985 B1 * | 1/2019 | Rader | G08C 23/02 |
| 2004/0220487 A1 * | 11/2004 | Vyshedskiy | A61B 5/24 |
| | | | 600/528 |
| 2007/0197878 A1 * | 8/2007 | Shklarski | A61B 5/0022 |
| | | | 128/903 |
| 2007/0222599 A1 * | 9/2007 | Coveley | G07C 9/28 |
| | | | 340/572.4 |
| 2008/0189360 A1 * | 8/2008 | Kiley | H04L 67/18 |
| | | | 709/203 |
| 2010/0217100 A1 * | 8/2010 | LeBoeuf | A61B 5/6826 |
| | | | 600/382 |
| 2010/0315549 A1 * | 12/2010 | Basso | H04N 21/4436 |
| | | | 348/445 |
| 2011/0301439 A1 * | 12/2011 | Albert | H04B 11/00 |
| | | | 600/301 |
| 2012/0092134 A1 * | 4/2012 | Stern | G01S 13/765 |
| | | | 340/10.1 |
| 2012/0229624 A1 * | 9/2012 | Calman | G16H 10/60 |
| | | | 348/135 |
| 2013/0044570 A1 * | 2/2013 | Mkrtchyan | A63H 3/28 |
| | | | 367/197 |
| 2013/0078988 A1 | 3/2013 | Bell et al. | |
| 2013/0079507 A1 | 3/2013 | Bell et al. | |
| 2013/0336497 A1 * | 12/2013 | Duplan | H04B 11/00 |
| | | | 381/77 |
| 2013/0346069 A1 | 12/2013 | Huang et al. | |
| 2014/0104059 A1 * | 4/2014 | Tran | A61B 5/0022 |
| | | | 340/539.12 |
| 2014/0185862 A1 | 7/2014 | Kamath | |
| 2015/0023402 A1 | 1/2015 | Osborn et al. | |
| 2015/0244472 A1 * | 8/2015 | Poppe | H04B 11/00 |
| | | | 367/135 |
| 2015/0270908 A1 | 9/2015 | Chang et al. | |
| 2016/0104190 A1 * | 4/2016 | Webster | H04L 65/4076 |
| | | | 705/14.4 |
| 2016/0140839 A1 * | 5/2016 | Hsieh | H03J 9/04 |
| | | | 367/199 |
| 2016/0241645 A1 * | 8/2016 | Sabbaghian | G06Q 30/0265 |
| 2016/0260161 A1 * | 9/2016 | Atchley | G05D 1/04 |
| 2018/0225655 A1 | 8/2018 | Abhishek | |
| 2019/0028208 A1 | 1/2019 | Abhishek et al. | |
| 2019/0229822 A1 | 7/2019 | Abhishek et al. | |

FOREIGN PATENT DOCUMENTS

| | | |
|---|---|---|
| JP | 2014224976 | 7/2015 |
| KR | 1020160150418 | 12/2016 |
| WO | 2019012554 A1 | 1/2019 |

OTHER PUBLICATIONS

Notification of First Action in corresponding Chinese Application No. 201880045190.5, dated Mar. 10, 2021.

* cited by examiner

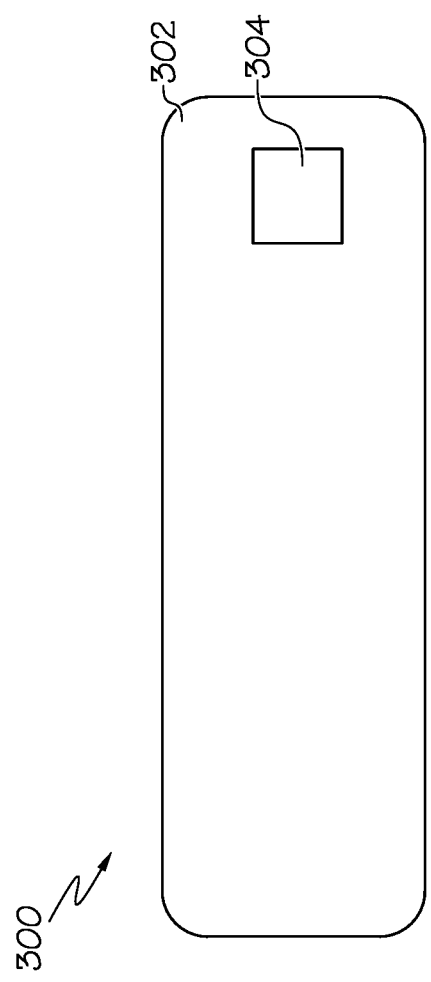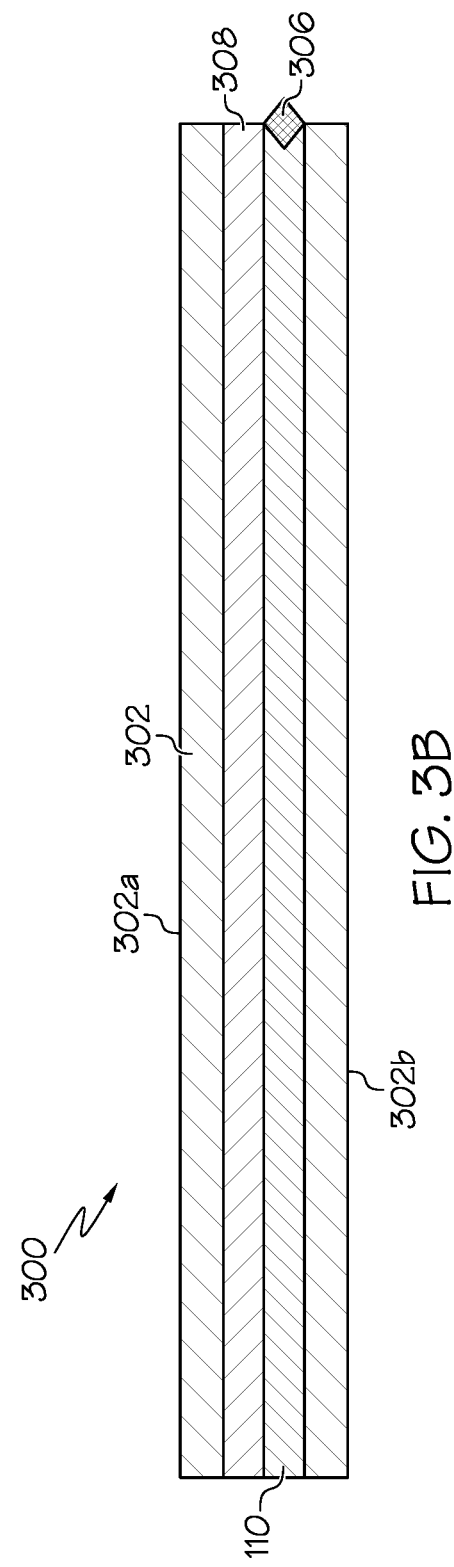
FIG. 3A
FIG. 3B

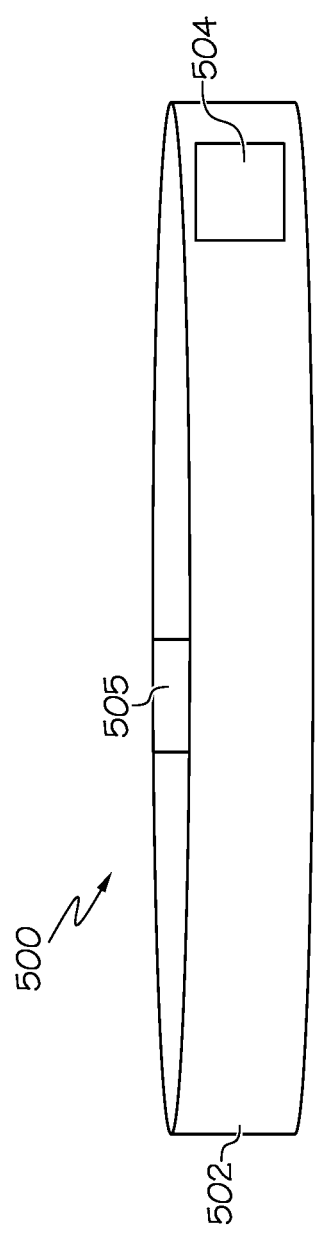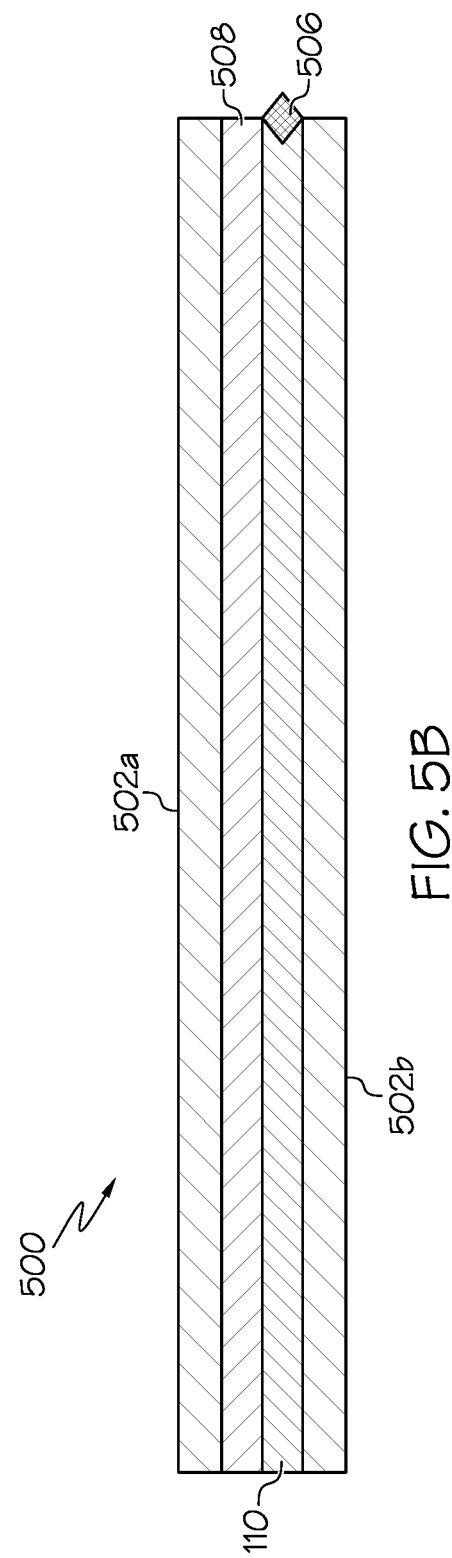

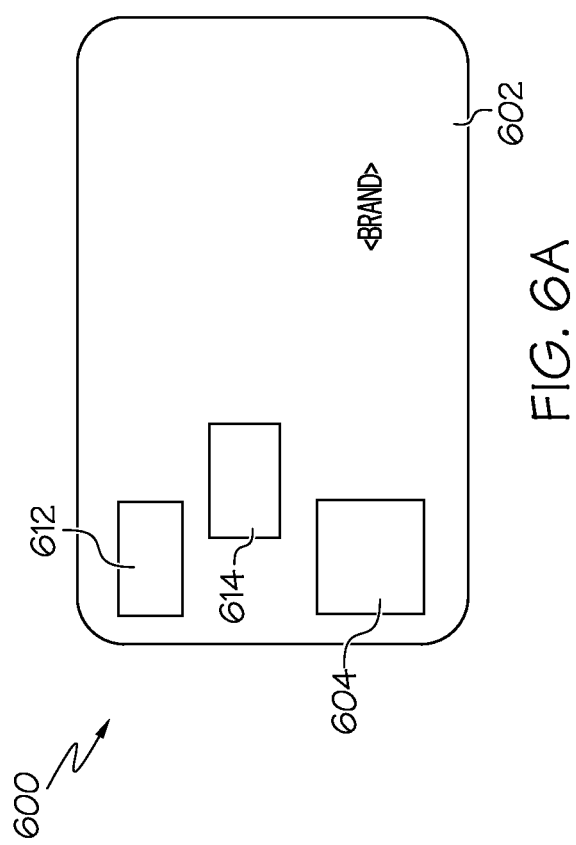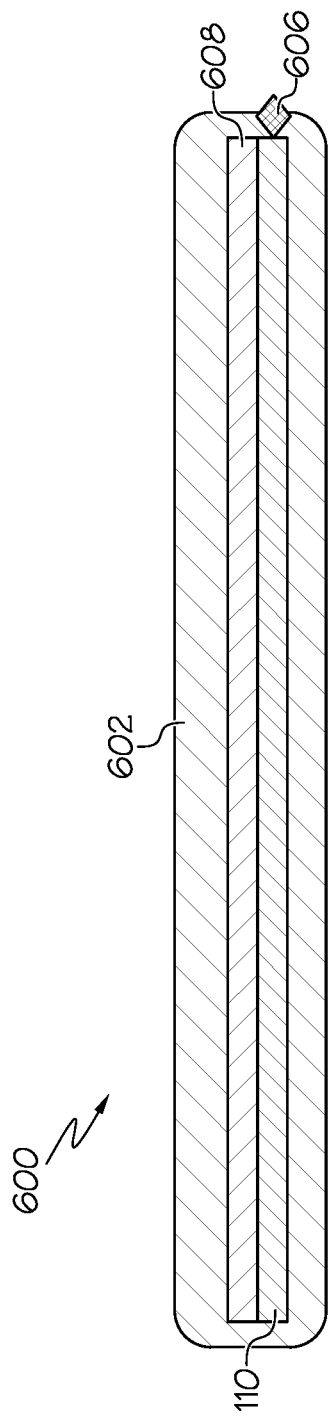

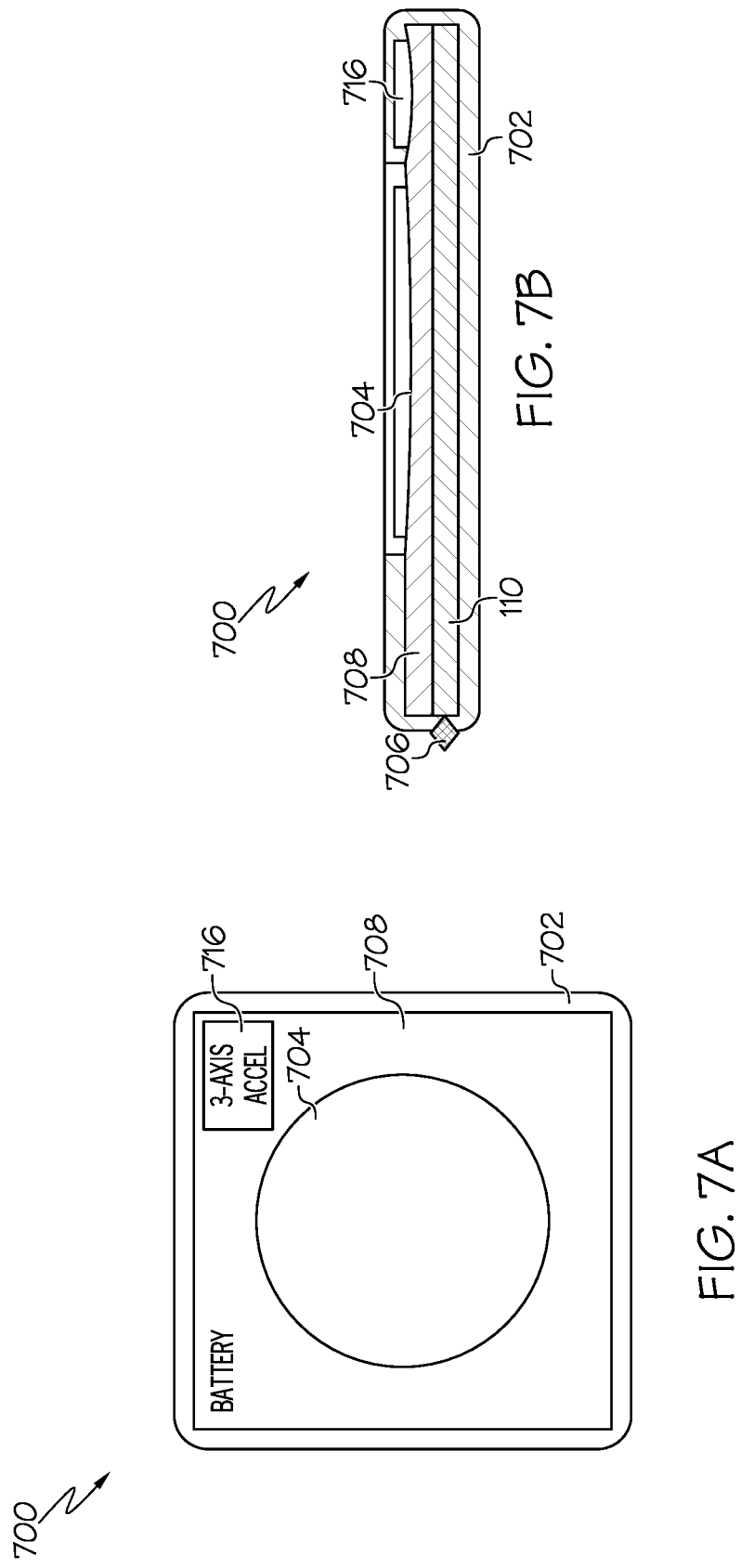

SYSTEMS AND METHODS FOR PROVIDING A TONE EMITTING DEVICE THAT COMMUNICATES DATA

CROSS REFERENCE

This application claims the benefit of PCT Application Serial Number PCT/US18/40540, filed on Jul. 2, 2018 which claims priority to U.S. Provisional Ser. No. 62/529,296 filed on Jul. 6, 2017, both of which are incorporated by reference in its entirety.

TECHNICAL FIELD

Embodiments described herein generally relate to systems and methods for utilizing tones to communicate information and, more specifically, to systems and methods for communicating data with a tone-emitting device.

BACKGROUND

While many advertisers, academic institutions, retailers, healthcare institutions, philanthropy institutions, payment instructions, etc. wish to reach consumers and improve the services they provide, many current technologies do not allow for such advancement. As an example, if a consumer visits a retail establishment, there is often difficulty locating products and paying for those products due to the inefficiencies of utilizing existing bar code technology. Similarly, tracking products, individuals, and/or other objects is often difficult, thus making inventory management, student participation, etc. difficult to manage.

SUMMARY

Embodiments disclosed herein generally relate to systems and methods for communicating data with a tone-emitting device. In one embodiment, a method for communicating data with a tone-emitting device includes receiving, by a tone-determining computing device of the tone-emitting device, data related to a characteristic of an object and encoding, by the tone-determining computing device, an inaudible tone that represents at least a portion of the data. The method further includes sending instructions by the tone-determining computing device, to a tone-emitting speaker of the tone-emitting device for outputting the inaudible tone.

In another embodiment, a tone-emitting device includes a tone-emitting speaker for emitting an inaudible tone and a tone-determining computing device communicatively coupled to the tone-emitting speaker. The tone-determining computing device includes a non-transitory computer-readable medium that stores logic that, when executed by the tone-determining computing device, causes the tone-determining computing device to receive data related to a characteristic of an object, encode an inaudible tone that represents at least a portion of the data and send instructions to the tone-emitting speaker for outputting the inaudible tone.

In yet another embodiment, a system for communicating an inaudible tone includes a tone-emitting device. The tone-emitting device includes a tone-emitting speaker for emitting an inaudible tone and a tone-determining computing device communicatively coupled to the tone-emitting speaker. The tone-determining computing device includes a non-transitory computer-readable medium that stores logic that, when executed by the tone-determining computing device, causes the tone-determining computing device to receive data related to a characteristic of an object, encode an inaudible tone that represents at least a portion of the data and send instructions to the tone-emitting speaker for outputting the inaudible tone.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIGS. 3A, 3B depict a tone-emitting self-adhesive label, according to embodiments described herein;

FIGS. 5A, 5B depict a tone-emitting bracelet, according to embodiments described herein;

FIGS. 6A, 6B depict a tone-emitting payment card, according to embodiments described herein;

FIGS. 7A, 7B depict a tone-emitting pod, according to embodiments described herein;

DETAILED DESCRIPTION

Figure 1:
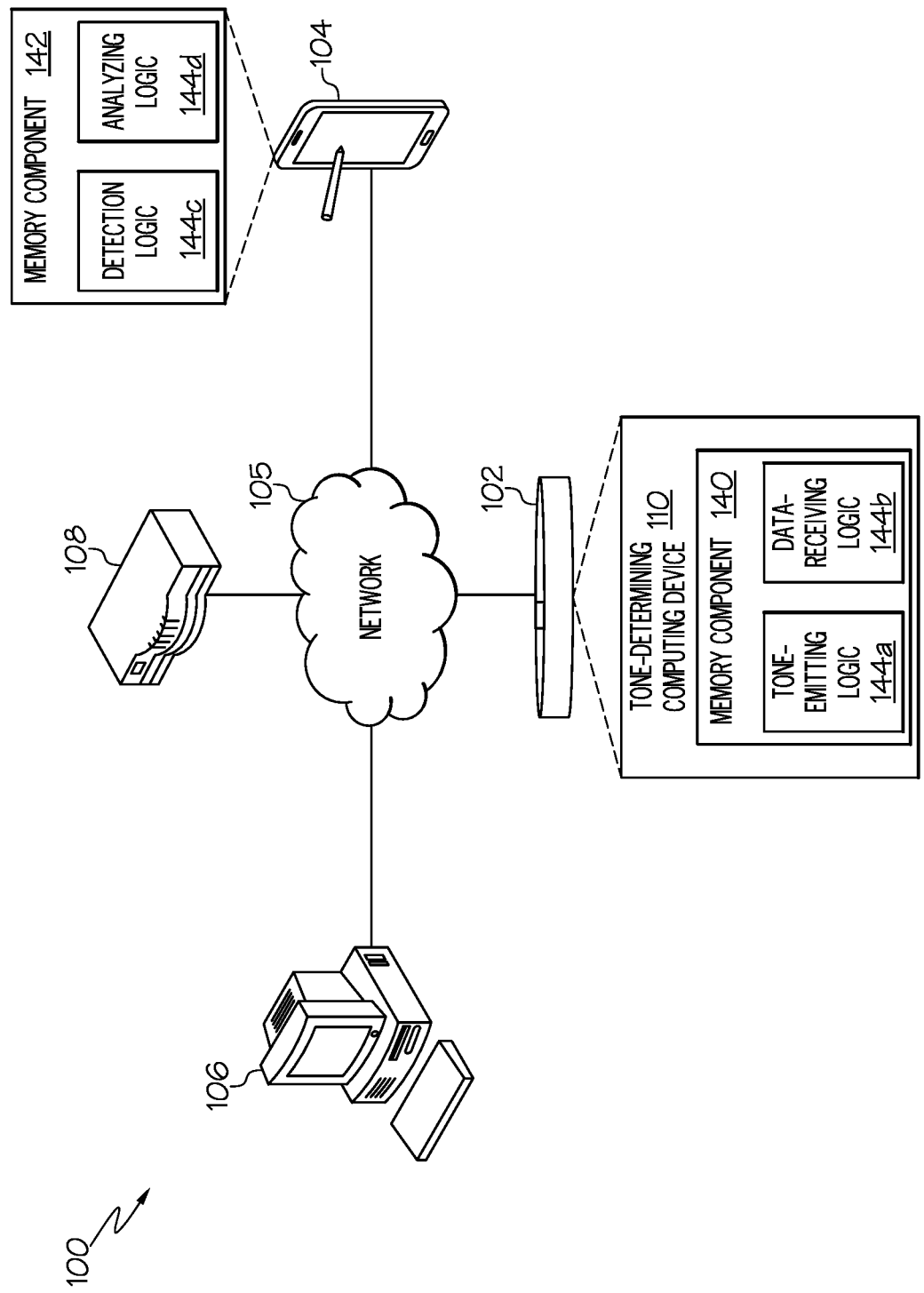
FIG. 1 depicts a computing environment for communicating data with a tone-emitting device, according to embodiments described herein.

Embodiments disclosed herein relate to systems and methods for communicating data with a tone-emitting device. The tone-emitting device may be configured as a shelf label, a self-adhesive label, a fob, a bracelet, a payment card, a pod, and/or other stationary device or portable device to be moved from a first location to a second location. In some embodiments, the data is related to a characteristic of an object, where the object may include a product, a person, and/or a mobile device. For example, the tone-emitting device could be carried by the person and/or be physically coupled to a product in a store. While references to a "tone" or "tones" may be used herein, it should be understood that, depending on the particular embodiment, one or more tones may be created and output for communicating the desired data.

The tone-emitting device may be configured to emit inaudible tones operating in non-naturally occurring frequency ranges of above 15 kHz to communicate the data. Based on input regarding the data to be communicated, the tone-emitting device selects pairs of the non-naturally occurring frequencies and assigns and/or selects sounds corresponding to the frequency pairs a unique character. Frequency pairs may be optimized to prevent intermodulation. Characters of the data may then be arranged in a sequence to form the inaudible tone. There may be trillions of sequences available, which ensures uniqueness of each inaudible tone. The data is then encoded as at least one inaudible tone and delivered to receivers in a communication device such as a cellular communication device, a stationary computing device, and/or other computing device. The recipient device may include hardware and/or software for decoding the received at least one tone.

In some embodiments, the tone-emitting device may be utilized to verify the identity of a user, such as in a payment verification system. In these embodiments, a tone emitting device may be coupled to a payment card (such as a credit card, a debit cart, etc.). If the user inserts or otherwise utilizes the payment card for payment (or cash), the tone-emitting device may output one or more tones that includes data such as payment data and authentication data of the user. At least a portion of the one or more tones may be received by a communication device (such as a mobile phone). Upon receiving the tones, the communication device may communicate authenticating information back to the payment card, the tone-emitting device, and/or the payment processing device. In embodiments where the payment card and/or tone-emitting device are configured to receive the return communication, the payment card and/or tone-emitting device may authenticate the communication device. Upon authenticating the communication device, the payment card may allow payment to be made. In embodiments where the payment processing device authenticates the communication device, the payment processing device may receive at least a portion of the tones from the tone-emitting device; receive the return communication from the communication device; authenticate the communication device; and then accept payment from the payment card.

In some embodiments, the communication device collects information such as metadata associated with the delivery of the inaudible tone. This information may include time and date when the tone was delivered, the type and brand of communication device where the tone was delivered, the location and weather near the communication device, the software application that received the tone, the user reaction on receiving the tone, and/or other information.

FIG. 1 depicts a computing environment 100 for communicating data with a tone-emitting device 102, according to embodiments described herein. The data is related to a characteristic of an object, which could be a product, a person, and/or a mobile device. As illustrated, the computing environment 100 includes a tone-emitting device 102 coupled to a network 105. The network 105 may be a wide area network (wired or wireless), such as the internet, a cellular network, or other communications network for communicating among devices across a wide area. The network 105 may include a wired or wireless local network for communicating the data, such as via a local area network, near field communication (NFC), Bluetooth, wireless fidelity (WiFi). As such, while the network 105 is depicted as an intermediary between two devices, this is merely an example depiction. Depending on the particular embodiment, communication may be facilitated between or among devices without an intermediary.

As described in further detail herein, the tone-emitting device 102 may be configured as a shelf label, a self-adhesive label, a fob, a bracelet, a card, a pod, etc. The tone-emitting device 102 is configured to emit an inaudible tone that communicates data. The tone-emitting device 102 includes a tone-determining computing device 110, which includes a memory component 140. The memory component 140 stores tone-emitting logic 144a, data-receiving logic 144b, and/or other logic.

In addition, the computing environment 100 includes one or more devices coupled to the network 105 such as, but not limited to, a communication device 104, a user computing device 106 and a stationary device 108. In the embodiment shown in FIG. 1, the communication device 104 may be configured as and/or include a user device or mobile phone. In some embodiments, the communication device 104 may be configured as a tablet, a laptop, personal computer, and/or other device for performing the functionality provided herein. Regardless, the communication device 104 includes a memory component 142 that stores detection logic 144c, analyzing logic 144d, and/or other logic. As described in more detail below, the detection logic 144c may be configured to cause the communication device 104 to detect one or more inaudible tones that are communicated by the tone-emitting device 102. The analyzing logic 144d may cause the communication device 104 to decode the tone and determine the data encoded therein.

In some embodiments, analyzing logic 144d may cause the communication device 104 to collect information such as metadata related to the delivery of the inaudible tone. Such information may include a time and date when the tone was delivered, the type and brand of communication device 104, a predetermined location where the tone was delivered, the location and weather near the communication device 104, and/or other information.

The user computing device 106 is coupled to the network 105 and may be configured to receive one or more tones from the tone-emitting device 102. While the user computing device 106 is depicted as a personal computer, this is just an example. In some embodiments, the user computing device 106 may be configured as a mobile device, tablet, server, point of sale system, automated teller machine (ATM), etc. The user computing device 106 is configured to receive data from the communication device 104 and/or a stationary device 108. The user computing device 106 may include a receiver for receiving the inaudible tone directly from the tone-emitting device 102. Accordingly, the user computing device 106 may include logic for decoding the data encoded with the inaudible tone and collecting associated metadata regarding the delivery of the inaudible tone, as described above.

The stationary device 108 may also be coupled to the network 105 and may be configured as a server, personal computer, tablet, mobile device, point of sale system, etc. As such, embodiments of the stationary device 108 may provide similar functionality (and include similar hardware and/or software) as the communication device 104; but may be fixed in its position or otherwise restricted in movement or restricted to a predetermined range of movement. In some embodiments, the stationary device 108 may not include a user interface, thus being utilized to receive the inaudible tone emitted by the tone-emitting device 102, decode the data encoded with the inaudible tone and report the data to the user computing device 106. However in some embodiments, the stationary device 108 may be configured to include a user interface to operate substantially similarly as the communication device 104. It should be understood herein that reference to a remote computing device may include a user computing device, and/or a stationary device operated by a third party for reporting the data to the remote computing device.

It should also be understood that embodiments of the tone-emitting device 102 may also be configured to communicate with one or more other devices via a different protocol, in addition to the described tones. In some embodiments, the tone-emitting device 102 may configured for Bluetooth communications, NFC communications, WiFi communications, etc. and thus may also include the appropriate hardware, software and firmware for facilitating these communications (e.g. a wireless transceiver, antennae, etc.). Similarly, the other devices depicted in FIG. 1 may also include this hardware, software, and firmware to facilitate communication with the tone-emitting device 102.

Figure 2A:
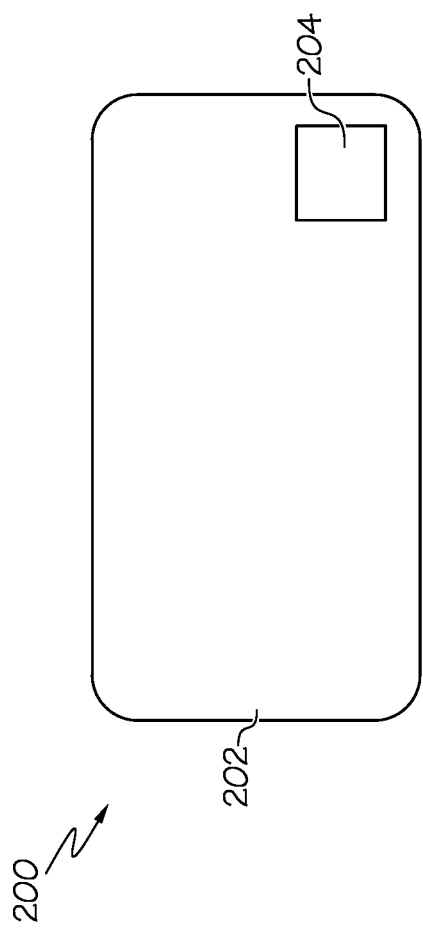
FIGS. 2A, 2B depict a tone-emitting shelf label, according to embodiments described herein.
Figure 2B:
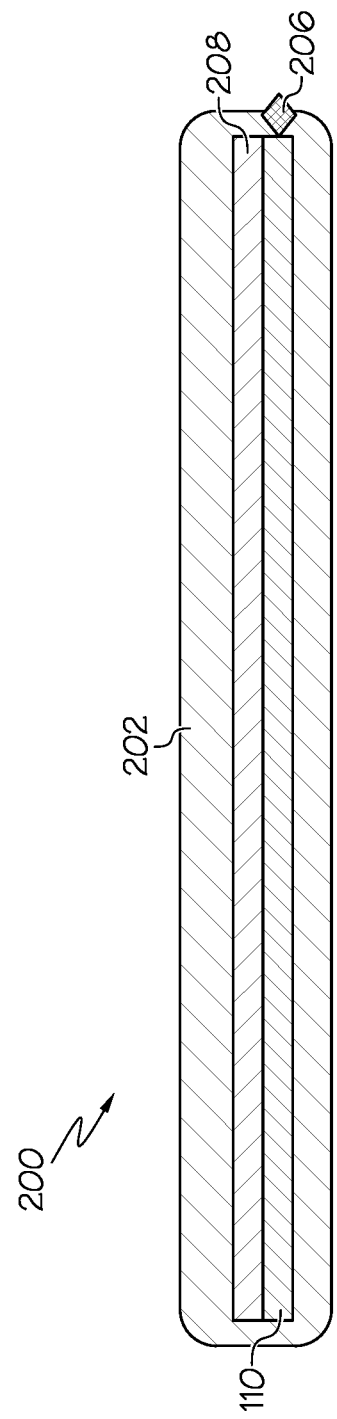

FIGS. 2A-2B depict a tone-emitting shelf label 200 for communicating a tone with data about an object, such as at retail shelf, according to embodiments described herein. FIG. 2A depicts a top view of the tone-emitting shelf label 200. FIG. 2B depicts a cross-sectional side view of the tone-emitting shelf label 200. The tone-emitting shelf label 200 includes a housing 202 and an output device, such as a tone-emitting speaker 204. The housing 202 may be constructed of plastic or other waterproof or water resistant material and may be printable by a 3-D printer. The tone-emitting speaker 204 is configured to emit an inaudible tone related to a characteristic of an object (such as a shelf, a product, etc.) that is coupled to the tone-emitting shelf label 200. The tone-emitting shelf label 200 further includes an input/output device port 206, a battery 208 and the tone-determining computing device 110 communicatively coupled to both the tone-emitting speaker 204 and the input/output device port 206. The input/output device port 206 is configured to receive user input to be delivered to the communication device 104. The input/output device port 206 may also be configured for communicating, in wired or wireless manner with other devices in the computing environment 100. The battery 208 is configured to electrically power the tone-determining computing device 110 and the tone-emitting speaker 204.

As discussed above, the tone-determining computing device 110 includes a memory component 140 for storing logic that when executed by the tone-determining computing device 110 causes the tone-determining computing device 110 to receive the user input on the data from the input/output device port 206, determine an inaudible tone for outputting to the communication device 104 and send instructions to the tone-emitting speaker 204 for delivering the data encoded with the inaudible tone to the communication device 104.

As an example, if the tone-emitting shelf label 200 is coupled to a shelf, the tone-emitting shelf label 200 may store data related to a product on the shelf. The data may include an identifier for the product, a description of the product, a price, coupons to the product or related products, a link to a website for the product, a number of products on the shelf, number of patrons that have visited the shelf, etc. As described in more detail below, when a communication device 104 (FIG. 1) detects a tone from the tone-emitting shelf label 200, the communication device 104 may decode the tone to determine the data being provided. This information may provide the user with additional information, options to purchase, restock the shelf, etc.

FIGS. 3A-3B depict a tone-emitting self-adhesive label 300 for communicating a tone with data related to an object, such as a product, according to embodiments described herein. FIG. 3A depicts a top view of the tone-emitting self-adhesive label 300, while FIG. 3B depicts a cross-sectional side view of the tone-emitting self-adhesive label 300. The tone-emitting self-adhesive label 300 includes a housing 302 and a tone-emitting speaker 304. The housing 302 may be constructed of plastic or other water resistant or waterproof material. The housing 302 includes a top surface 302a and an adhesive bottom surface 302b configured to be coupled to an object. The tone-emitting speaker 304 is configured to emit an inaudible tone related to a characteristic of an object coupled to the tone-emitting self-adhesive label 300. The tone-emitting self-adhesive label 300 further includes an input/output device port 306, a battery 308 and the tone-determining computing device 110 communicatively coupled to both the tone-emitting speaker 304 and the input/output device port 306. The input/output device port 306 and the battery 308 are substantially similar in structure and function to the input/output device port 206 and battery 208, as described above.

As discussed above, the tone-determining computing device 110 includes a memory component 140 for storing logic that when executed by the tone-determining computing device 110 causes the tone-determining computing device 110 to receive the user input on the data from the input/output device port 306, determine an inaudible tone for emitting to the communication device 104 and send instructions to the tone-emitting speaker 304 for delivering the data encoded with the inaudible tone to the communication device 104.

It should be understood that while the embodiments of the tone-emitting shelf label 200 of FIGS. 2A, 2B and the tone-emitting self-adhesive label 300 of FIGS. 3A, 3B may be similar, some embodiments may exhibit differences. For example, because the tone-emitting shelf label 200 may apply to different products at different times, the tone-emitting shelf label 200 may be configured for reprogramming when new or different products arrive. Conversely, because the tone-emitting self-adhesive label 300 may be applied to a product (and thus may be disposable), some embodiments may be configured to only receive one set of data and/or be configured to determine only one set of tones to output. However, this is not a requirement.

Figure 4A:
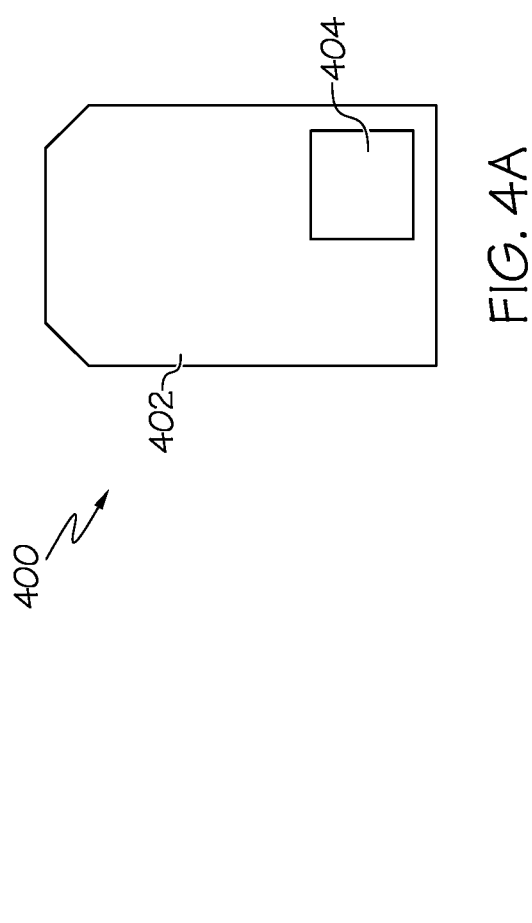
FIGS. 4A, 4B depict a tone-emitting fob, according to embodiments described herein.
Figure 4B:
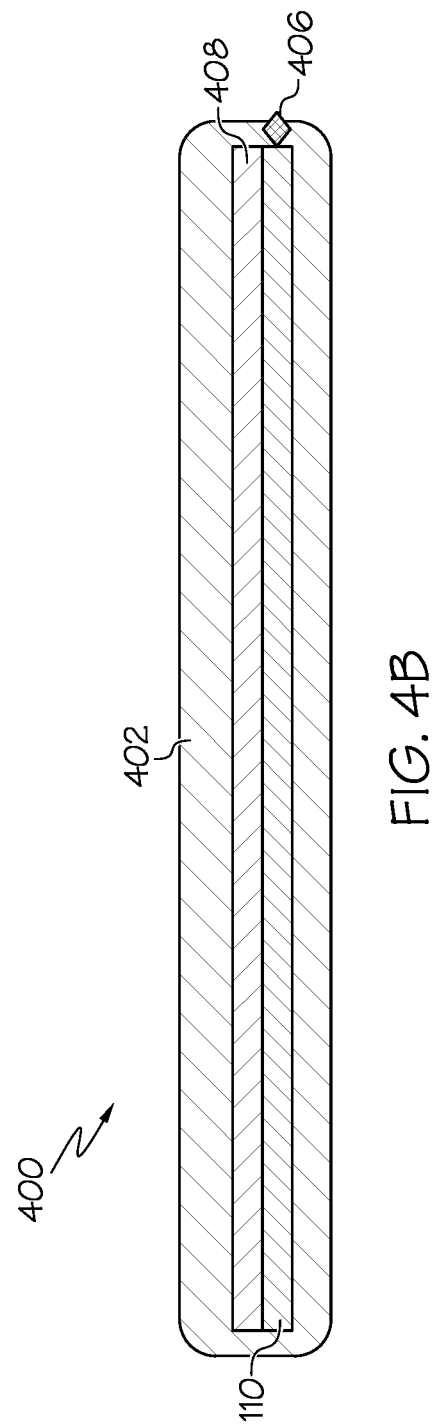

FIGS. 4A-4B depict a tone-emitting fob 400 for communicating a tone with data associated with a product, such as a user, according to embodiments described herein. FIG. 4A depicts a top view of the tone-emitting fob 400. FIG. 4B depicts a cross-sectional side view of the tone-emitting fob 400. The tone-emitting fob 400 includes a housing 402 and a tone-emitting speaker 404. The housing 402 is constructed of plastic or other waterproof or water resistant material. The tone-emitting speaker 404 is configured to emit an inaudible tone encoded with data about the person who carries the tone-emitting fob 400. The tone-emitting fob 400 further includes an input/output device port 406, a battery 408 and the tone-determining computing device 110 communicatively coupled to both the tone-emitting speaker 404 and the input/output device port 406. The input/output device port 406 and the battery 408 are substantially similar in structure and function to the input/output device port 206 and battery 208, as described above.

As discussed above, the tone-determining computing device 110 includes a memory component 140 for storing logic that when executed by the tone-determining computing device 110 causes the tone-determining computing device 110 to receive the user input on the data from the input/output device port 406, determine an inaudible tone for emitting to the communication device 104 and send instructions to the tone-emitting speaker 404 for delivering the data encoded with the inaudible tone to the communication device 104.

It should be understood that embodiments of the tone-emitting fob 400 described herein may differ from the tone-emitting shelf label 200 of FIGS. 2A, 2B and the tone-emitting self-adhesive label 300 of FIGS. 3A, 3B in application and/or functionality. While in some embodiments, the tone-emitting fob 400 may be very similar, some embodiments may be configured to be carried by a user, such as a conference attendee or other event attendee. As such, the tone-emitting fob 400 may receive data related to the user, such as locations at the event that the user has attended, identifying information regarding the user, other attendees with whom the user has interacted, etc. As an example, the tone-emitting fob 400 may be configured to emit a tone that is representative of the user identification, such that when the user enters a predetermined area, the user is automatically registered as being in attendance. However, some embodiments may be configured for the tone-emitting fob 400 to output different data, based on the situation. As an example, if the user is talking with other event attendees, the tone-emitting fob 400 may communicate data to mobile phones of other event attendees, which may include contact information of the user. The other event attendees may then access the mobile phone to see the contact information of the user. In some embodiments, the different information may be provided via a user selection of an option on the tone-emitting fob 400 (such as a button disposed on the tone-emitting fob 400). Some embodiments however, may be configured for the tone-emitting fob 400 to determine a location of the user (globally, locally, and/or relative to other devices and/or fobs) and provide different information, based on that location.

FIGS. 5A-5B depict a tone-emitting bracelet 500 for communicating a tone with data associated with a user, according to embodiments described herein. FIG. 5A depicts a top view of the tone-emitting bracelet 500. FIG. 5B depicts a cross-sectional side view of the tone-emitting bracelet 500. The tone-emitting bracelet 500 includes a housing 502 and a tone-emitting speaker 504. The housing 502 is constructed of plastic or other waterproof or water resistant material. The housing 502 includes a top surface 502a and a bottom surface 502b. The bottom surface 502b of the tone-emitting bracelet 500 makes contact with a wearer's skin and hence may have a hypoallergenic coating thereon. The housing 502 includes a securing mechanism 505 such as but not limited to, a snap, Velcro, a buckle, etc. for securing the tone-emitting bracelet 500 around a wrist. The tone-emitting speaker 504 is configured to emit an inaudible tone encoded with data about the person to whom the tone-emitting bracelet 500 is secured. The tone-emitting bracelet 500 further includes an input/output device port 506, a battery 508 and the tone-determining computing device 110 communicatively coupled to both the tone-emitting speaker 504 and the input/output device port 506. The input/output device port 506 and the battery 508 are substantially similar in structure and function to the input/output device port 206 and the battery 208, as described above.

As discussed above, the tone-determining computing device 110 includes a memory component 140 for storing logic that when executed by the tone-determining computing device 110 causes the tone-determining computing device 110 to receive the user input on the data from the input/output device port 506, determine an inaudible tone for emitting to the communication device 104 and send instructions to the tone-emitting speaker 504 for delivering the data encoded with the inaudible tone to the communication device 104.

As an example, embodiments described here may be utilized for a medical facility guest. As such, the information stored by the tone-emitting bracelet 500 may include identifying information, medical information (subject to HIPAA protocols), access authentication, and/or other information. As an example, when a user checks into a hospital, the tone-emitting bracelet 500 may receive data associated with the user, such as an identifier. The tone-emitting bracelet 500 may then output one or more inaudible tones that communicate the stored information to communication devices of the medical professionals. The tone-emitting bracelet 500 may also include information that will authenticate the user to access (or deny access) to certain areas of the medical facility. As an example, if the wearer is a medical patient at the medical facility, doors to operating rooms may be locket to the wearer. However, the wearer may have access to his/her room to which others may be denied access. As such, the doors of the medical facility may be equipped with a stationary device 108 to receive the inaudible tone and grant or deny access. As discussed above, the tone-emitting bracelet 500 may be configured to communicate different tones, based on location, and/or in response to user input. In some embodiments, the same information may be output by the tone-emitting bracelet 500, but the communication device 104 and/or the stationary device 108 that receives the tones may be specifically configured to decode predetermined frequency bands, encodings, etc.

FIGS. 6A-6B depict a tone-emitting payment card 600 for payment authentication, according to embodiments described herein. FIG. 6A depicts a top view of the tone-emitting payment card 600. FIG. 6B depicts a cross-sectional side view of the tone-emitting payment card 600. The tone-emitting payment card 600 includes a housing 602 and a tone-emitting speaker 604. The housing 602 is constructed of plastic or other waterproof or water resistant material. The housing 602 may include a signature stripe, bar code, magnetic strip, authentication chip, etc. The tone-emitting speaker 604 is configured to emit an inaudible tone encoded with data about the person owning the tone-emitting payment card 600. The tone-emitting payment card 600 further includes an input/output device port 606, a battery 608, a chip 612, a microphone 614 and the tone-determining computing device 110 communicatively coupled to both the tone-emitting speaker 604 and the input/output device port 606. The input/output device port 606 and the battery 608 are substantially similar in structure and function to the input/output device port 206 and battery 208, as described above. The chip 612 is configured to store payment and/or identity information of the person owning the tone-emitting payment card 600. The microphone 614 is configured to accept any verbal input from the person owning the tone-emitting payment card 600.

As discussed above, the tone-determining computing device 110 includes a memory component 140 for storing logic that when executed by the tone-determining computing device 110 causes the tone-determining computing device 110 to receive the user input on the data from the input/output device port 606, determine an inaudible tone for emitting to the communication device 104 and send instructions to the tone-emitting speaker 604 for delivering the data encoded with the inaudible tone to the communication device 104.

As an example, one embodiment of the tone-emitting payment card 600 receives authenticating data. The authenticating data may also be received by a communication device 104, such as the user's mobile phone. As such, if the tone-emitting payment card 600 is scanned for making a payment (or withdrawing cash), prior to authorizing the transaction, the tone-emitting payment card 600 may output the tone. If the user's phone is in the vicinity, it will receive the tone and can respond with authentication that the tone-emitting payment card 600 is associated with the phone and, thus the user. The phone's response may also be a tone back to the tone-emitting payment card 600; other wireless communication to the tone-emitting payment card 600, and/or a communication to the payment processing device (or associated servers). If the mobile phone communicates back to the tone-emitting payment card 600, this authentication may allow the tone-emitting payment card 600 to release the credit card number (or provide other payment authorization) to the payment processing device for completing the transition. If the mobile phone communicates with the payment processing device, the payment processing device may withhold the transaction until the mobile device is authenticated.

FIGS. 7A-7B depict a tone-emitting pod 700 for communicating a tone with data about an object, according to embodiments described herein. FIG. 7A depicts a top view of the tone-emitting pod 700. FIG. 7B depicts a cross-sectional side view of the tone-emitting pod 700. The tone-emitting pod 700 includes a housing 702 and a tone-emitting speaker 704. The housing 702 is constructed of plastic or other waterproof or water resistant material. The tone-emitting speaker 704 is configured to emit an inaudible tone encoded with data about promotions such as, but not limited to offers, coupons, special access, etc. to the communication device 104. The tone-emitting pod 700 further includes an input/output device port 706, a battery 708, an accelerometer 716 and the tone-determining computing device 110 communicatively coupled to the tone-emitting speaker 704, the input/output device port 706 and the accelerometer 716.

The accelerometer 716 may be a triaxial accelerometer and is configured to detect a position and orientation of the tone-emitting pod 700 with respect to the communication device 104. When the communication device 104 is within a certain range or distance from the accelerometer 716, the tone-determining computing device 110 is notified of the presence of the communication device 104, so that the tone-emitting pod 700 may emit the inaudible tone encoded with the data to the communication device 104.

As discussed above, the tone-determining computing device 110 includes a memory component 140 for storing logic that when executed by the tone-determining computing device 110 causes the tone-determining computing device 110 to receive the user input on the data from the input/output device port 706, determine an inaudible tone for emitting to the communication device 104 and send instructions to the tone-emitting speaker 704 for delivering the data encoded with the inaudible tone to the communication device 104.

As an example, the tone-emitting pod 700 may be utilized at a movie theater. The accelerometer 716 may detect orientation and movement of a user to determine when the user is seated in the theater and when the user is moving, such as to the concession stand. Based on the location and/or movement, the tone-emitting pod 700 may output a tone to the user's mobile device and/or to a stationary device 108 FIG. 1, such as at a concession stand. If the user is detected as moving, the tone-emitting pod 700 may output a tone that is received by the stationary device 108 at the concession stand. The stationary device 108 may then push coupons, menu items, options for payment and/or other information to the user to facilitate purchase of concessions. As the user returns to the theater, the tone-emitting pod 700 may authenticate access to the theater.

Figure 8A:
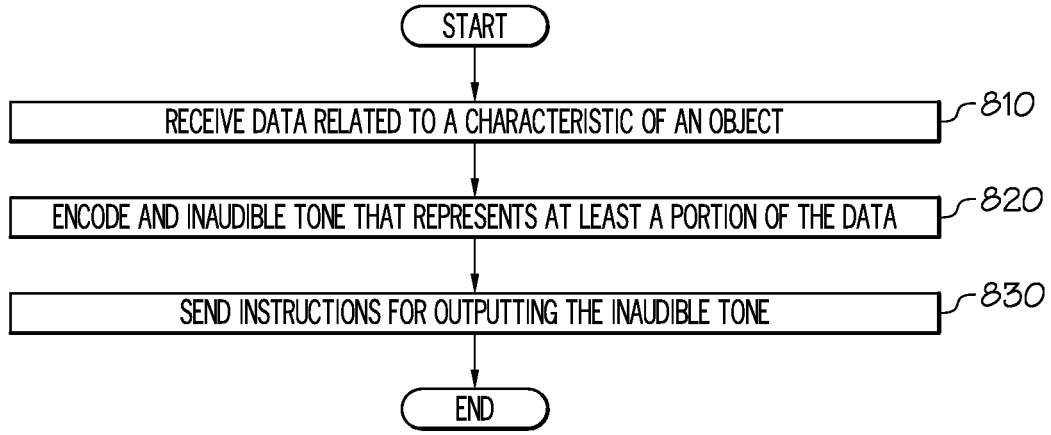
FIGS. 8A, 8B depict flowcharts for communicating data with a tone-emitting device, according to embodiments described herein.
Figure 8B:
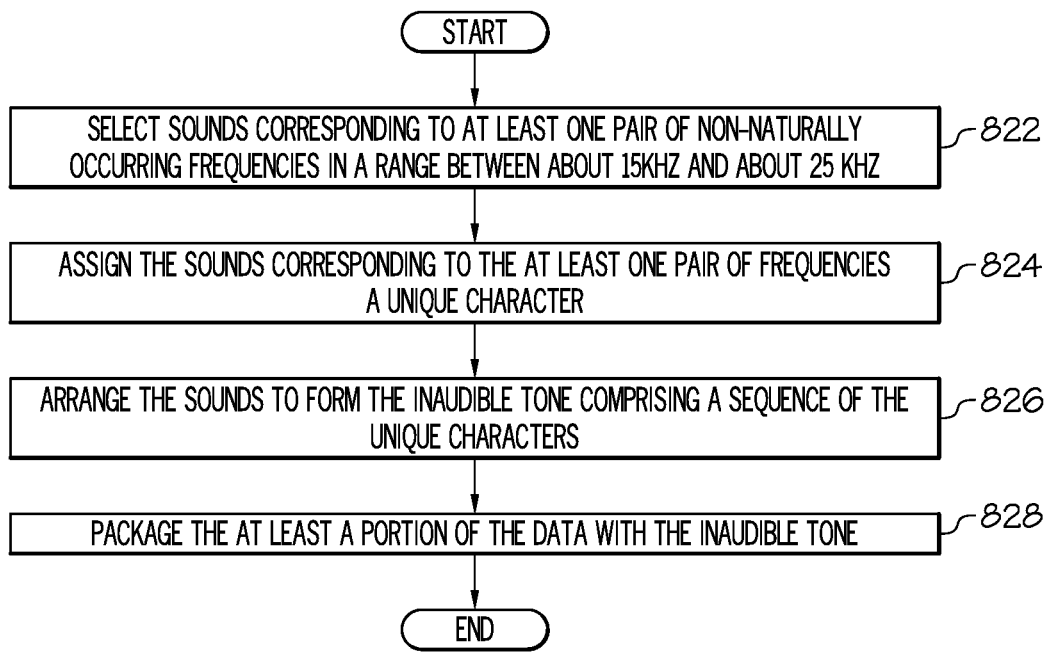

FIGS. 8A, 8B depict a flowchart for communicating data with a tone-emitting device 102, according to embodiments described herein. FIG. 8A depicts a block diagram of a flowchart implemented by a tone-determining computing device 110 within the tone-emitting device 102. In block 810, the tone-determining computing device 110 receives data related to a characteristic of an object. In some embodiments, the object is a product in a retail environment, a person and/or a mobile device. In some embodiments, the mobile device may be configured as a fob or a bracelet worn by a person or a payment card. In block 820, the tone-determining computing device 110 encodes an inaudible tone that represents at least a portion of the data. In block 830, the tone-determining computing device 110 sends instructions to a tone-emitting speaker 204 of the tone-emitting device 102 for outputting the inaudible tone.

FIG. 8B depicts a flowchart for encoding the inaudible tone in block 820. In block 822, the tone-determining computing device 110 selects sounds corresponding to at least one pair of non-naturally occurring frequencies in a range between about 15 kHz and about 25 kHz. All frequency pairs are optimized to prevent intermodulation. In block 824, the tone-determining computing device 110 assigns the sounds corresponding to the at least one pair of frequencies a unique character. In block 826, the tone-determining computing device 110 arranges the sounds to form the inaudible tone comprising a sequence of the unique characters. In block 828, the tone-determining computing device 110 encodes at least a portion of the data into the inaudible tone.

The tone-emitting device 102 described above can be configured in any of a plurality of ways to communicate data and thus can become a powerful tool in managing communications regarding objects and people in a variety of environments. As an example, the tone-emitting device 102 may be configured as a tone-emitting shelf-label for inventory management in a retail store or a warehouse. The tone-emitting shelf-label may be attached to individual inventory items placed on shelves of the retail store or warehouse. One or more stationary devices 108, such as the stationary device 108 may be placed in the retail store or warehouse and configured to communicate with the tone-emitting shelf-label on each individual inventory item and a remote computing device, such as the user computing device 106. The user computing device 106 may be configured to store and manage details of the individual inventory items. The tone-emitting shelf-label is configured to emit an inaudible tone encoded with data related to the identity, location and price of the individual inventory item as well as identity of the tone-emitting shelf-label. The stationary device 108 is configured to receive the inaudible tone emitted by each tone-emitting shelf-label attached to the individual inventory items. The stationary device 108 then decodes the inaudible tone to determine the data encoded with the inaudible tone and reports the data to the user computing device 106. Since the individual inventory items emit the inaudible tone once or more over a predetermined time (which may be set by a user) in the store or warehouse, the inventory is updated accordingly as the individual inventory items are transferred, added or removed from the store or warehouse.

Figure 9:
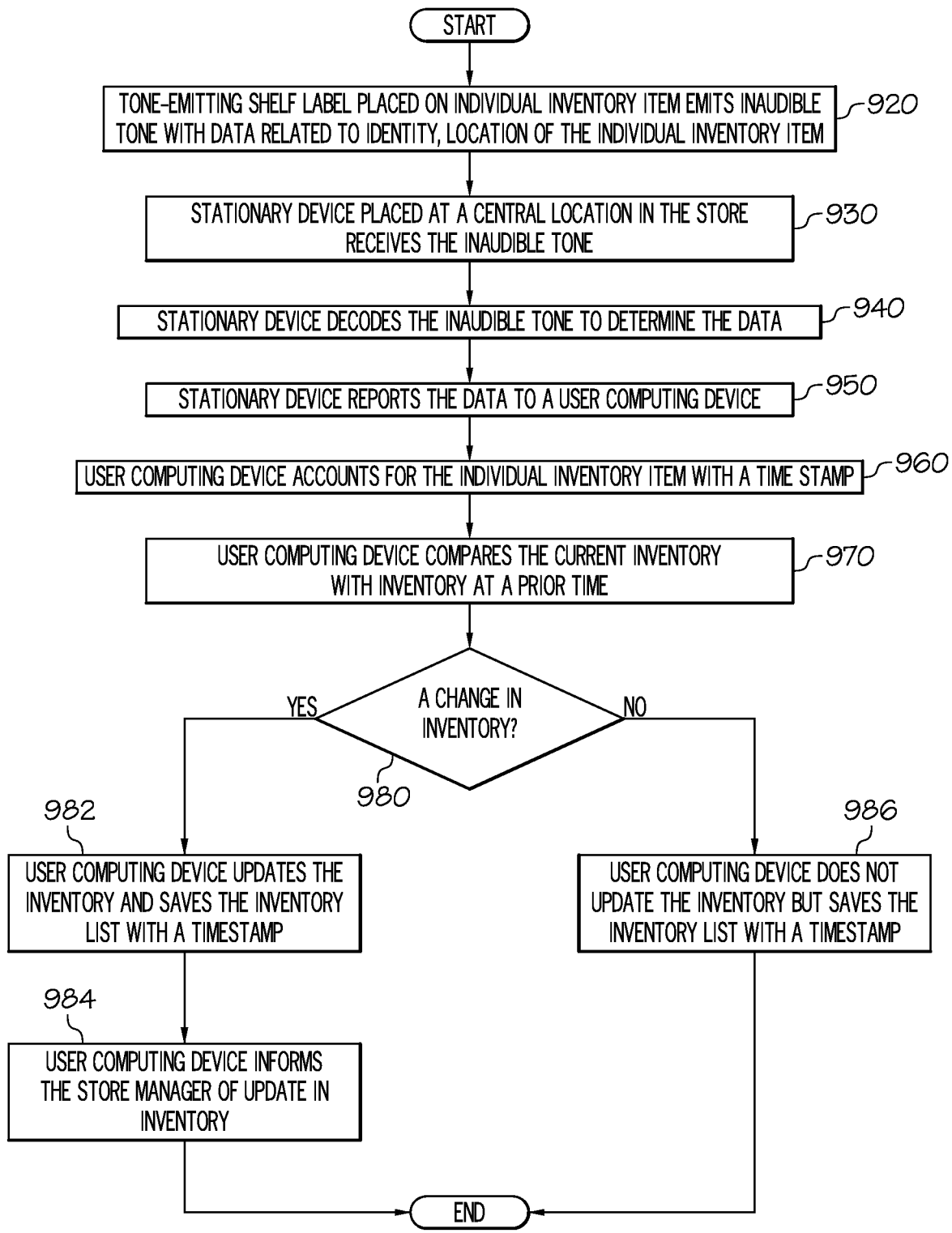
FIG. 9 depicts a flowchart for utilizing a tone-emitting shelf label for inventory management, according to embodiments described herein.

FIG. 9 depicts a flowchart for utilizing a tone-emitting shelf-label for inventory management, according to embodiments described herein. As illustrated in block 920, the tone-emitting shelf label 200 that has been placed on an individual inventory item may emit an inaudible tone with data related to the identity and/or location of the inventory item. In block 930, a stationary device 108 placed at a central location in the store receives the inaudible tone. In block 940, the stationary device 108 decodes the inaudible tone to determine the data related to the identity and/or location of the individual inventory item. In block 950, the stationary device 108 reports the data to a remote computing device. In block 960, the remote computing device accounts for each individual inventory item with a timestamp, upon receiving the data from the stationary device 108. In block 970, the user computing device 106 compares the current inventory with the inventory at a prior time. In block 980, the user computing device 106 determines whether there is a change in inventory. If there is a change in inventory, in block 982, the user computing device 106 updates the inventory and saves the inventory list with a timestamp. In block 984, the user computing device 106 then informs the store manager or a user in the store of the update in the inventory. If there is no change in inventory, in block 986, the user computing device 106 does not update the inventory list but saves the inventory list with a timestamp.

In some embodiments, the tone-emitting device 102 is configured as a tone-emitting self-adhesive label 300 for retail checkout in a retail store. The tone-emitting self-adhesive label 300 may be attached to individual retail items placed in the retail store. The tone-emitting self-adhesive label 300 is configured to emit an inaudible tone encoded with data related to the identity and price of the individual retail item as well as identity of the tone-emitting self-adhesive label 300. This tone may be utilized when the retail item is placed on a shopping cart by a customer during retail checkout. The mobile device of the customer may be configured to receive the inaudible tone emitted by the tone-emitting self-adhesive label 300 attached to the individual retail items selected by the customer for purchase. The mobile device then decodes the inaudible tone and determines the data encoded in the inaudible tone. The mobile device then calculates the cost of all the retail items placed on the shopping cart and opens a payment application to facilitate payment of the retail items as the customer leaves the store. Thus, the customer need not wait in queue or interact with a cashier after selecting the products for purchase and the retail store need not invest in expensive checkout hardware.

Figure 10:
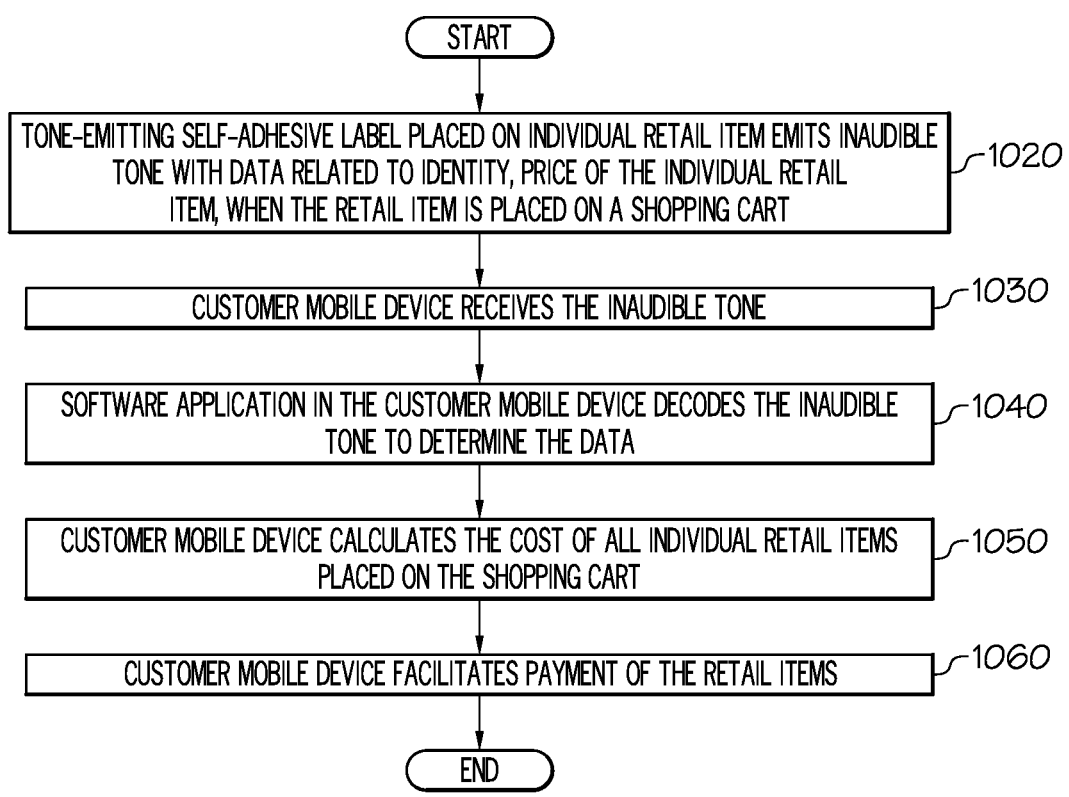
FIG. 10 depicts a flowchart for utilizing a tone-emitting self-adhesive label for retail checkout at a store, according to embodiments described herein.

FIG. 10 depicts a flowchart for utilizing a tone-emitting self-adhesive label 300 for retail checkout at a store, according to embodiments described herein. As illustrated in block 1020, the tone-emitting self-adhesive label 300 emits an inaudible tone encoded with data related to the identity and price of the individual retail item. In block 1030, a communication device 104, such as the mobile device of the customer receives the inaudible tone through a receiver. In block 1040, the mobile device of the customer decodes the inaudible tone to determine the data related to an identity and price of the individual retail item. In block 1050, the mobile device of the customer calculates the cost of at least a portion of the individual retail items placed on the shopping cart. In block 1060, the mobile device of the customer facilitates payment of the retail items on the shopping cart.

In some embodiments, the tone-emitting device 102 is configured as a tone-emitting fob 400 for registration and attendance at an event such as a conference, an educational institution, etc. The tone-emitting fob 400 is carried or worn by an attendee of the event. One or more stationary devices 108, such as the stationary device 108 may be placed at centralized locations in the premises of the event and configured to communicate with the tone-emitting fob 400 and the user computing device 106. The user computing device 106 is configured to store and manage details of each attendee. The tone-emitting fob 400 is configured to emit an inaudible tone encoded with data related to the identity and location of the attendee as well as identity of the tone-emitting fob 400, when the attendee enters the premises of the event. The stationary device 108 is configured to receive the inaudible tone emitted by the tone-emitting fob 400 and decode the inaudible tone to determine the data.

The stationary device 108 may then report the data to the user computing device 106. The user computing device 106 may update attendee registration and/or attendance accordingly. If an attendee is reported by the stationary device 108 as attending the event, the user computing device 106 updates and saves the attendee list with a timestamp. The attendee list may also be used for comparing with another attendee list generated with a subsequent timestamp. The user computing device 106 may also report an attendance administrator or the attendees that are present. If an attendee fails to enter the premises within a certain period of time, the user computing device 106 informs the attendance administrator or manager of the identity and location of the missing attendee if the attendee is within range of any of the stationary devices 108. The user computing device 106 also sends an alert to the mobile device of the attendee requesting him/her to attend the event.

Figure 11:
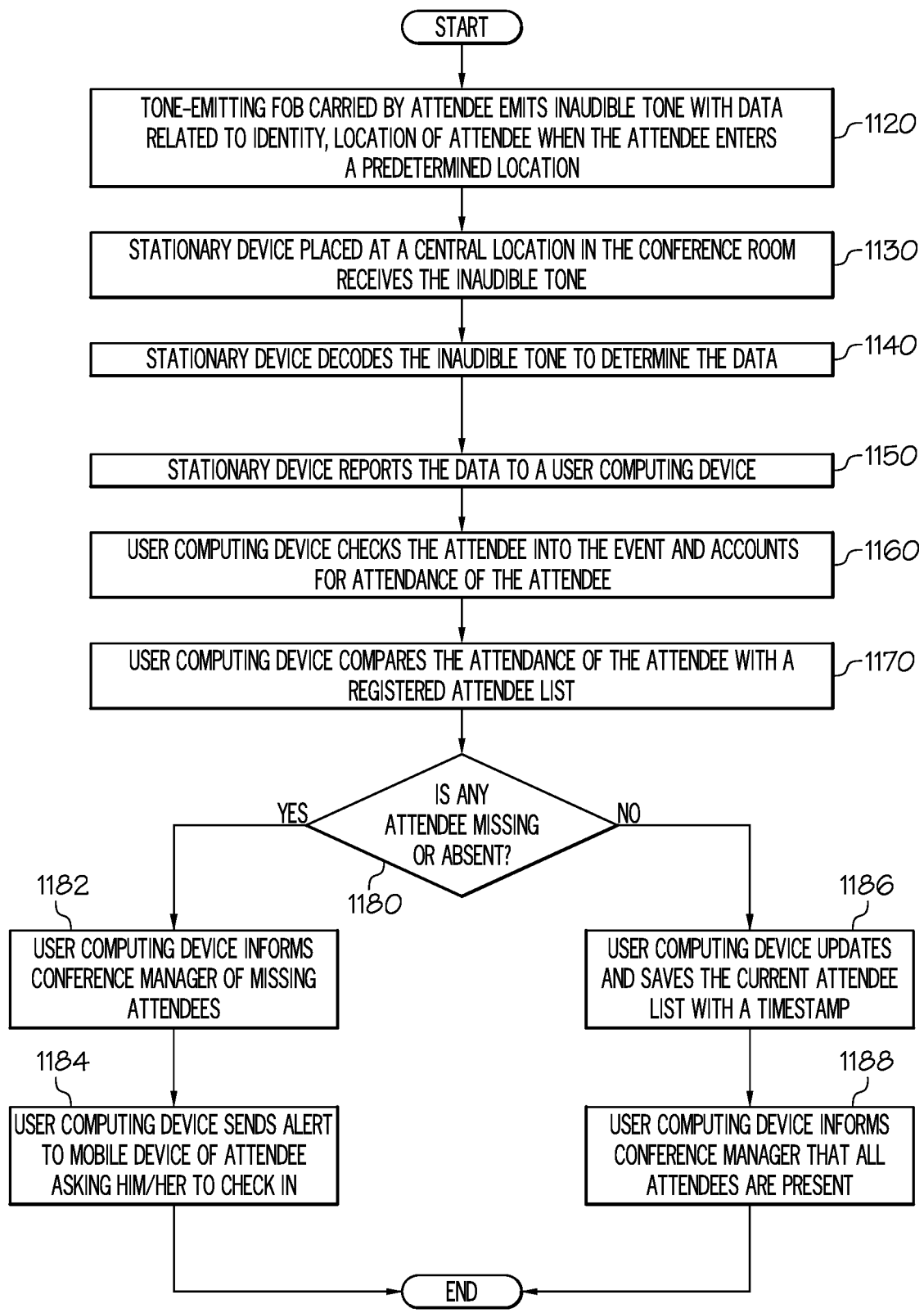
FIG. 11 depicts a flowchart for utilizing a tone-emitting fob for attendance registration at an event, according to embodiments described herein.

FIG. 11 depicts a flowchart for utilizing a tone-emitting fob 400 for attendance registration at an event, according to embodiments described herein. As illustrated in block 1120, the tone-emitting fob 400 emits an inaudible tone with data related to identity and location of the attendee, when the attendee enters the premises of the event. In block 1130, the stationary device 108 placed at the central location receives the inaudible tone. In block 1140, the stationary device 108 decodes the inaudible tone to determine data related to the identity and location of the attendee. In block 1150, the stationary device 108 reports the data to a user computing device 106. In block 1160, the user computing device 106 checks the attendee into the event and accounts for attendance of the attendee. In block, 1170, the user computing device 106 compares the attendance of the attendee with a registered attendee list. In block 1180, the user computing device 106 determines if there is any attendee missing or absent. If there is an attendee absent, in block 1182, the user computing device 106 informs the event manager of the missing attendees. In block 1184, the user computing device 106 then sends alert to the mobile device of the attendee requesting him/her to check in to the event. If there are no attendees absent, in block 1186 the user computing device 106 updates and saves the registered attendee list with a timestamp. In block 1188, the user computing device 106 informs the event manager that all registered attendees are present in the event.

In some embodiments, the tone-emitting device 102 is configured as a tone-emitting bracelet 500 for patient management at a medical facility. The tone-emitting bracelet 500 may be carried or worn by a patient or other visitor of the medical facility (such as patient visitor, medical professional, etc.). One or more stationary devices 108 may be placed at centralized locations in the premises of the medical facility and configured to communicate with the tone-emitting bracelet 500 and a user computing device 106. The user computing device 106 is configured to store and manage details of each patient at the medical facility. The tone-emitting bracelet 500 is configured to emit an inaudible tone encoded with data related to the identity, location, and medical details of the patient as well as identity of the tone-emitting bracelet 500, when a medical professional authorized to attend the patient at the medical facility requests access to information about the patient through his/her mobile device, the tone-emitting bracelet 500 may communicate the inaudible tone. The mobile device of the authorized medical professional is configured to receive the inaudible tone emitted by the tone-emitting bracelet 500. As the mobile device of the authorized medical professional is placed within range of the tone-emitting bracelet 500 or one of the stationary devices 108 in the medical facility, the mobile device receives the inaudible tone. The authorized medical professional then inputs authenticating data (such as a password, biometric authentication, etc.) in response to the receipt of the inaudible tone. Once the authorized medical professional is authenticated, the mobile device of the authorized medical professional decodes the inaudible tone to determine the data related to identity, location and medical details of the patient as well as any metadata such as time of access to the data. If the authorized medical professional is not authenticated, the data is not accessible to him/her.

Figure 12:
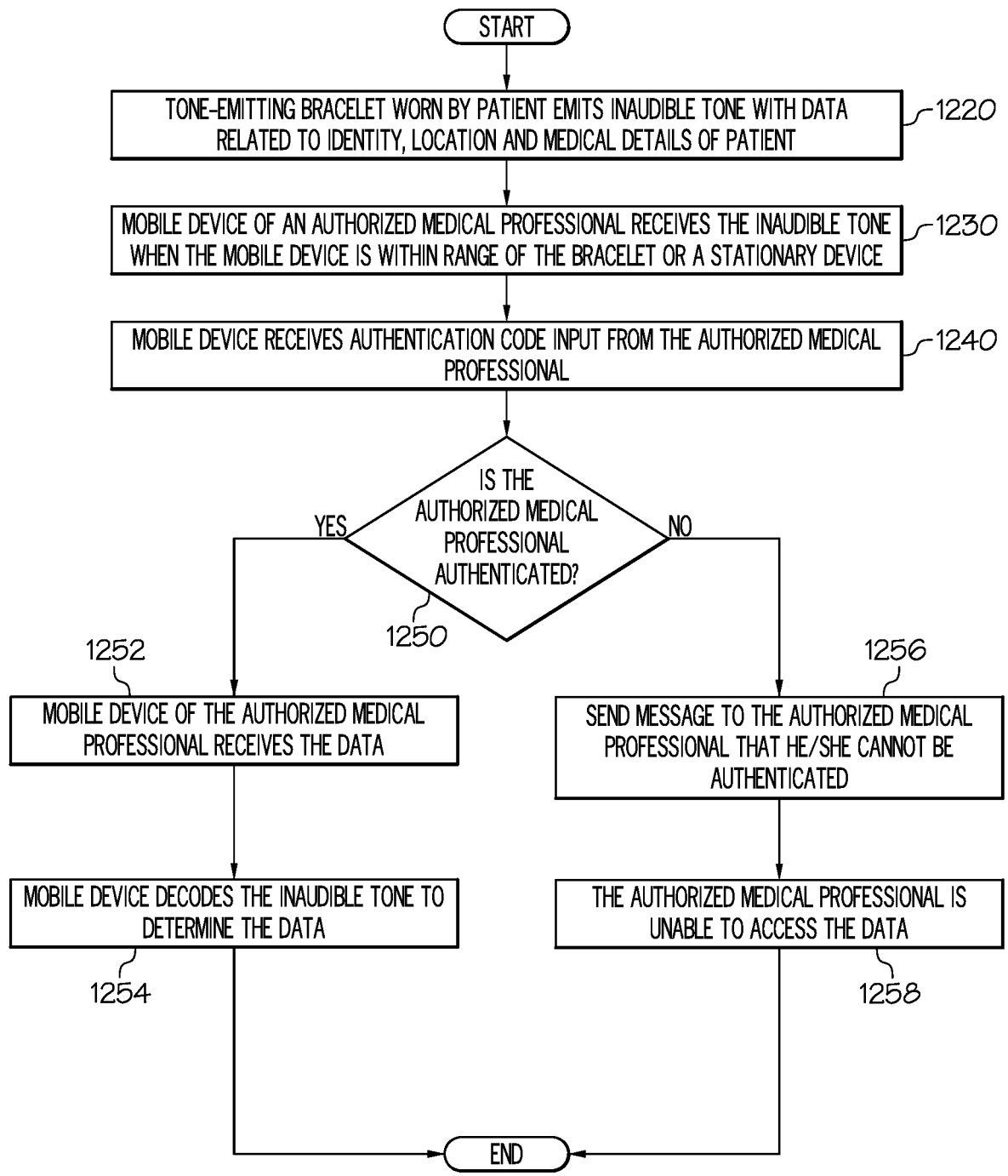
FIG. 12 depicts a flowchart for utilizing a tone-emitting bracelet for patient management at a medical facility, according to embodiments described herein.

FIG. 12 depicts a flowchart for utilizing a tone-emitting bracelet 500 for patient management at a medical facility, according to embodiments described herein. As illustrated in block 1220, the tone-emitting bracelet 500 emits an inaudible tone with data related to identity, location and medical details of the patient. In block 1230, a communication device 104, such as a mobile device of an authorized medical professional receives the inaudible tone when the mobile device is within the range of the tone-emitting bracelet 500 or a stationary device 108 placed in the premises of the medical facility. In block 1240, the mobile device receives an authentication code inputted by the authorized medical professional in response to the receipt of the inaudible tone. In block 1250, the mobile device determines if the authorized medical professional is authenticated. If the authorized medical professional is authenticated, in block 1252, the mobile device of the authorized medical professional receives the data related to the identity, location and medical details of the patient. In block 1254, the mobile device decodes the inaudible tone to determine the data. If the authorized medical professional is not authenticated, in block 1256, the mobile device delivers a message to the authorized medical professional that he/she cannot be authenticated. In block 1258, the authorized medical professional is unable to access the data.

Figure 13:
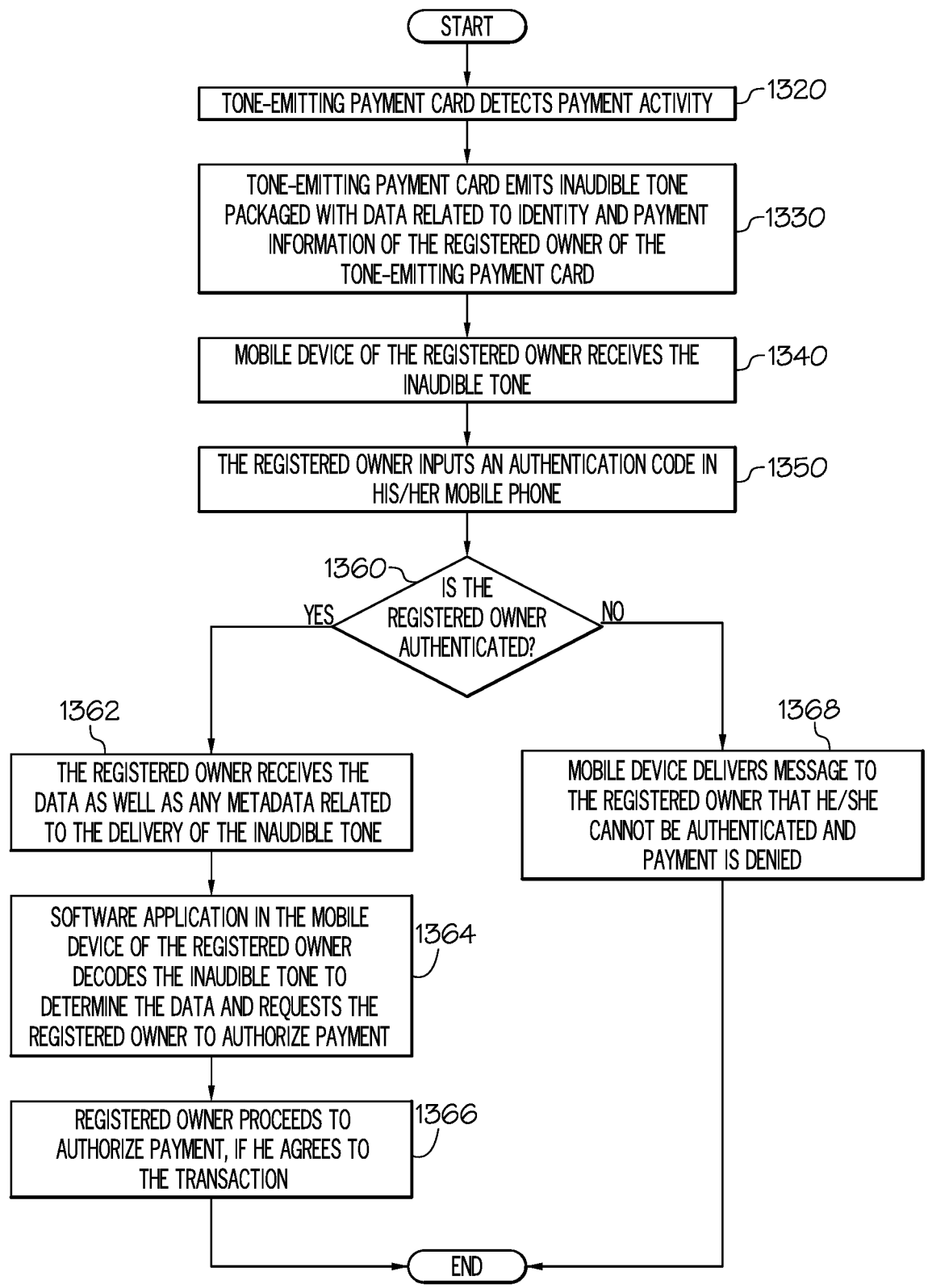
FIG. 13 depicts a flowchart for utilizing a tone-emitting payment card for payment verification, according to embodiments described herein.

In some embodiments, the tone-emitting device 102 is configured as a tone-emitting payment card 600 for verification of the registered owner of the card and for subsequent authorization of payment. A tone-emitting payment card 600 is carried by a user and may be used in making payments or withdrawing money from an automated teller machine (ATM). The tone-emitting payment card 600 is configured to emit an inaudible tone encoded with data related to identity and payment information of the registered owner, when he/she attempts to make a payment using the tone-emitting payment card 600. A communication device 104, such as the mobile device of the registered owner is configured to receive the inaudible tone emitted by the tone-emitting payment card 600. The registered owner then inputs authenticating data in response to the receipt of the inaudible tone. Once the registered owner is authenticated, the registered owner's mobile device decodes the inaudible tone to determine the data related to identity and payment information as well as any metadata such as time of access to the data. The mobile device then proceeds to request the owner to authorize the payment in the transaction. Thus, if the mobile device is unable to verify the ownership of the tone-emitting payment card 600 with the authentication code, the tone-emitting payment card 600 denies the payment in the transaction. For example, if a person who is not the registered owner of the tone-emitting payment card 600 initiates payment activity, the FIG. 13 depicts a flowchart for utilizing a tone-emitting payment card 600 for payment authorization and verification, according to embodiments described herein. As illustrated in block 1320, the tone-emitting payment card 600 detects payment activity. The payment activity may include a card swipe for credit card payment or withdrawal request at an ATM. In block 1330, the tone-emitting payment card 600 emits an inaudible tone encoded with data related to identity and payment information of the registered owner. In block 1340, a communication device 104, such as the mobile device of the registered owner of the tone-emitting payment card 600 receives the inaudible tone. In block 1350, the registered owner inputs authenticating data to the mobile phone in response to the receipt of the inaudible tone. In block 1360, the mobile device determines if the registered owner is authenticated. If the registered owner is authenticated, in block 1352, the registered owner receives the data related to the identity, transactional and payment information as well as any metadata such as time of access to the data. In block 1354, the mobile device of the registered owner decodes the inaudible tone to determine the data and requests the registered own to authorize the payment in the transaction. In block 1356, the registered owner proceeds to authorize payment, if he agrees to the transaction. If the registered owner is not authenticated, in block 1358, the mobile device delivers a message to the registered owner that he/she cannot be authenticated and payment is denied.

In some embodiments, the tone-emitting device 102 is configured as a tone-emitting pod 700 placed on or near a box office or theater to generate sales of products in an entertainment venue such as, but not limited to, a movie theater or a Broadway theater. The tone-emitting pod 700 is configured to emit an inaudible tone encoded with data related to products, offers, etc. as well as identity of the tone-emitting pod 700, when a communication device 104, such as the mobile device of a customer is placed within range of the tone-emitting pod 700. The mobile device of the customer is configured to receive the inaudible tone emitted by the tone-emitting pod 700. A mobile device of the customer then decodes the inaudible tone and determines the data encoded with the inaudible tone. The mobile device of the customer prompts the customer to download and/or open the software application. The customer is incentivized to open the software application through the delivery of promotions such as but not limited to offers, coupons, special access, etc. present in the data. The software application displays the promotions present in the data and applies the promotions towards any payment transaction made by the customer using the mobile device in the entertainment venue.

Figure 14:
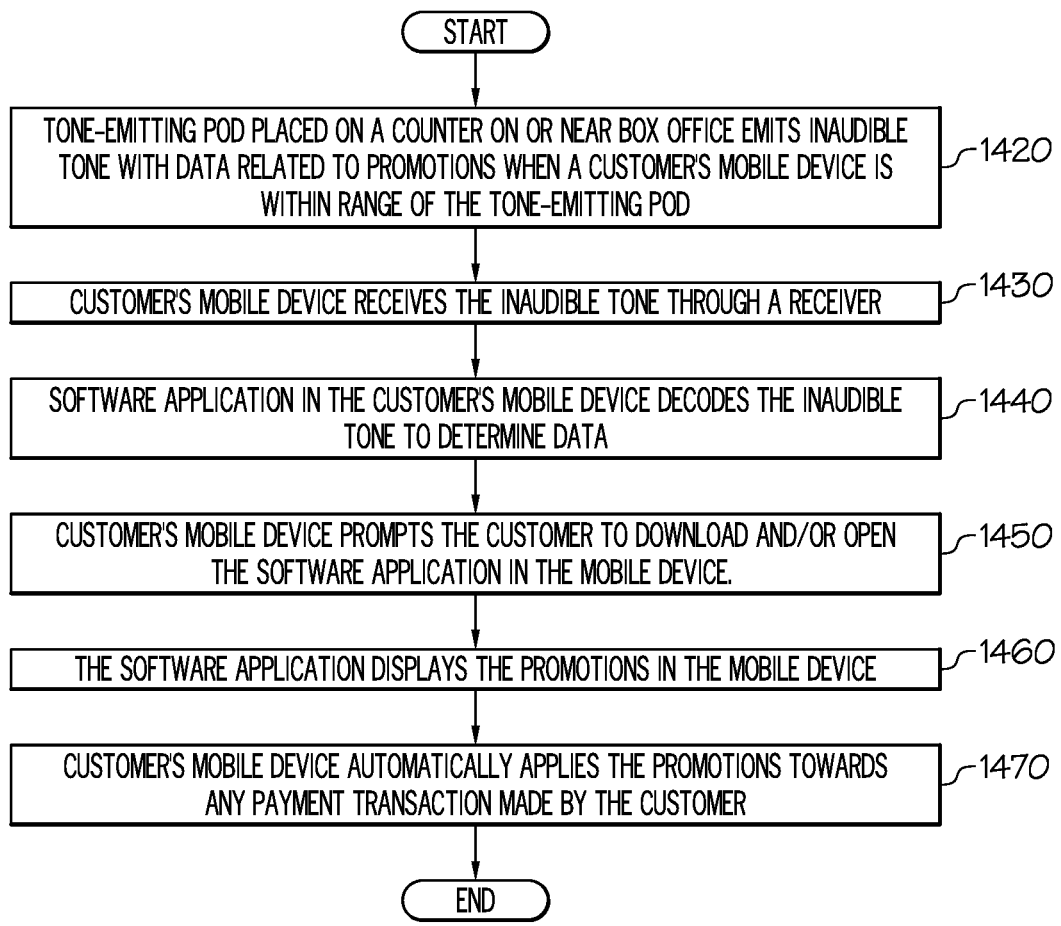
FIG. 14 depicts a flowchart for utilizing a tone-emitting pod for sales at an entertainment venue, according to embodiments described herein.

FIG. 14 depicts a flowchart for utilizing a tone-emitting pod 700 for generating sales at an entertainment venue, according to embodiments described herein. As illustrated in block 1420, the tone-emitting pod 700 emits an inaudible tone encoded with data related to products, offers, etc. as well as identity of the tone-emitting pod 700, when a communication device 104, such as a mobile device of a customer is placed within range of the tone-emitting pod 700. In block 1430, a mobile device of a customer receives the inaudible tone through a receiver. In block 1440, a mobile device of the customer decodes the inaudible tone to determine the data. In block 1450, the mobile device prompts the customer to download and/or open the software application in the mobile device. In block 1460, the software application displays any promotions such as but not limited to offers, coupons, special access, etc. present in the data. In block 1470, the software application automatically applies the promotions towards any payment transaction made by the customer using the mobile device in the entertainment venue.

Figure 15:
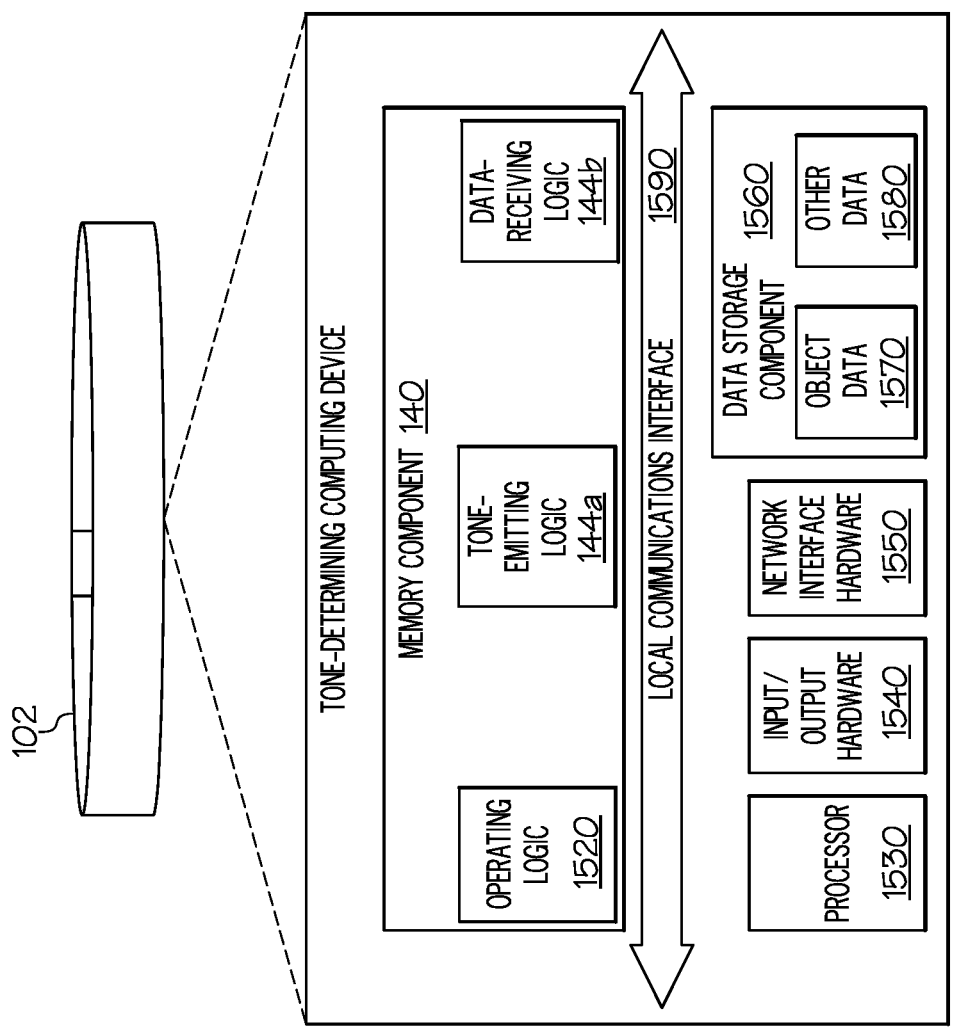
FIG. 15 depicts a tone-determining computing device in the tone-emitting device, according to embodiments described herein.

FIG. 15 shows a block diagram of illustrative hardware components of the tone-determining computing device 110 in the tone-emitting device 102, according to embodiments described herein. The tone-determining computing device 110 includes a processor 1530, input/output hardware 1540, the network interface hardware 1550, a data storage component 1560 (which stores object data 1570 and/or other data 1580), and the memory component 140. Each of the components of the tone-determining computing device 110 may be communicatively coupled to a local communications interface 1590. The local communications interface 1590 is generally not limited by the present disclosure and may be implemented as a bus or other communications interface to facilitate communication among the components of the computing environment 100.

The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), Blu-Ray discs, and/or other types of non-transitory computer-readable mediums. Depending on the particular embodiment, these non-transitory computer-readable mediums may reside within or outside the tone-determining computing device 110 of the tone-emitting device 102. The memory component 140 may store, for example, operating logic 1520, tone-emitting logic 144a and data-receiving logic 144b.

The operating logic 1520, the tone-emitting logic 144a and the data-receiving logic 144b may each include a plurality of different pieces of logic, each of which may be embodied as a computer program, firmware, and/or hardware, as an example. The operating logic 1520 may include an operating system and/or other software for managing components of the tone-emitting device 102. As also discussed above, the tone-emitting logic 144a may reside in the memory component 140 and may be configured to cause the processor 1530 to determine a tone to send and may cause the speaker to emit the tone. Similarly, the data-receiving logic 144b may be utilized to receive message data, object data, and/or other data, as well as communicate data to other devices, as described herein.

The processor 1530 may include any processing component operable to receive and execute instructions (such as from the data storage component 1560 and/or the memory component 140). Illustrative examples of the processor 1530 include, but are not limited to, a computer processing unit (CPU), a many integrated core (MIC) processing device, an accelerated processing unit (APU), a digital signal processor (DSP). In some embodiments, the processor 1530 may be a plurality of components that function together to provide processing capabilities, such as integrated circuits (including field programmable gate arrays (FPGA)) and the like.

The input/output hardware 1540 may include and/or be configured to interface with microphones, speakers, a display, and/or other hardware. For example, the input/output hardware 1540 may interface with hardware that provides a user interface to a user for the purposes of adjusting settings, viewing a status, and/or the like.

The network interface hardware 1550 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the tone-emitting device 102 and other computing devices, such as the communication device 104 (FIG. 1).

The data storage component 1560 may generally be any medium that stores digital data, such as, for example, a hard disk drive, a solid state drive (SSD), a compact disc (CD), a digital versatile disc (DVD), a Blu-Ray disc, and/or the like. It should be understood that the data storage component 1560 may reside local to and/or remote from the tone-emitting device 102 and may be configured to store one or more pieces of data and selectively provide access to the one or more pieces of data.

It should be understood that while the components in FIG. 15 are illustrated as residing within the tone-emitting device 102, this is merely an example. In some embodiments, one or more of the components may reside external to the tone-emitting device 102. In some embodiments, the tone-emitting logic 144a and the data-receiving logic 144b may reside on different computing devices. As an example, one or more of the functionalities and/or components described herein may be provided by the communication device 104, the user computing device 106, the stationary device 108, and/or other device, which may be coupled to the tone-emitting device 102 via the network 105. Additionally, while the tone-emitting device 102 is illustrated with the tone-emitting logic 144a and the data-receiving logic 144b as separate logical components, this is also an example. In some embodiments, a single piece of logic may cause the tone-emitting device 102 to provide the described functionality.

As illustrated above, various embodiments for providing a tone-emitting device are disclosed. These embodiments may enhance tracking of a person and/or object, purchases without point of sale, and/or other functionality.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems and methods for communicating contextually-relevant information through a tone-emitting device. These embodiments provide significantly more than what is common in the technology in that inaudible tones are utilized to provide functionality that has not been provided in the art. As an example, embodiments described herein provide authentication that was previously unavailable. Embodiments also provide communication among a plurality of devices for sharing data, authenticating access to data, and the like. It should also be understood that these embodiments are merely exemplary and are not intended to limit the scope of this disclosure.

What is claimed is:

1. A method for communicating data with a tone-emitting device comprising:
receiving, by a tone-determining computing device of the tone-emitting device, data related to a characteristic of an object, wherein the object includes a visitor in a medical facility and wherein the characteristic includes an identity of the visitor, a location of where the visitor is to be, facility access for the visitor, and medical details of the visitor;
encoding, by the tone-determining computing device, a first inaudible tone that includes a first pair of non-naturally occurring frequencies and represents at least a portion of the medical details of the visitor, the location of the visitor, and the identity of the visitor;
encoding, by the tone-determining computing device, a second inaudible tone that includes a second pair of non-naturally occurring frequencies and represents data related to the identity of the visitor, the location of where the visitor is to be and the facility access for the visitor;
sending first instructions by the tone-determining computing device, to a tone-emitting speaker of the tone-emitting device for outputting the first inaudible tone and the second inaudible tone, wherein the first inaudible tone is sent in response to receiving a user input to broadcast the medical data of the visitor and is received by a mobile communication device of a medical professional, wherein the mobile communication device must authenticate to receive access to a portion of the data for which the communication device or user of the communication device is authorized to receive, and wherein upon authenticating, the communication device decodes the portion of the data for which the communication device or user of the communication device is authorized to receive, wherein in response to the medical professional not being able to authenticate, denying access to the medical data to the medical professional and providing a message to the medical professional that access to the medical data is denied; and
sending second instructions by the tone-determining computing device, to a tone-emitting speaker of the tone-emitting device for outputting the second inaudible tone, wherein the second inaudible tone is received by a stationary device that determines whether, based on the characteristic, the visitor is granted access to a portion of the facility, and wherein the second inaudible tone changes, based on a location of the visitor.

2. The method of claim 1, wherein encoding the inaudible tone further comprises:
selecting sounds corresponding to at least one pair of non-naturally occurring frequencies in a range between about 15 kHz and about 25 kHz;
assigning the sounds corresponding to the at least one pair of frequencies a unique character;
arranging the sounds to form the inaudible tone comprising a sequence of the unique characters; and
sending the at least a portion of the data with the inaudible tone.

3. A tone-emitting device comprising:
a tone-emitting speaker for emitting an inaudible tone;
a tone-determining computing device communicatively coupled to the tone-emitting speaker and comprising a non-transitory computer-readable medium that stores logic that, when executed by the tone-determining computing device, causes the tone-determining computing device to perform at least the following:
receive data related to a characteristic of an object, wherein the object includes a visitor in a medical facility and wherein the characteristic includes an identity of the visitor, a location of where the visitor is to be, facility access for the visitor, and medical details of the visitor;
encode a first inaudible tone that includes a first pair of non-naturally occurring frequencies and represents at least a portion of the data;
encode a second inaudible tone that includes a second pair of non-naturally occurring frequencies and represents data related to of the facility access for the visitor;
send first instructions to the tone-emitting speaker for outputting the first inaudible tone, wherein the first inaudible tone is sent in response to receiving a user input to broadcast the medical data of the visitor and is received by a communication device, wherein the communication device must authenticate to receive access to a portion of the data for which the communication device or user of the communication device is authorized to receive, and wherein upon authenticating, the communication device decodes the portion of the data for which the communication device or user of the communication device is authorized to receive, wherein in response to the medical professional not being able to authenticate, denying access to the medical data to the medical professional and providing a message to the medical professional that access to the medical data is denied; and
send second instructions to a tone-emitting speaker of the tone-emitting device for outputting the second inaudible tone, wherein the second inaudible tone is received by a stationary device that determines whether, based on the characteristic, the visitor is granted access to a portion of the facility, and wherein the second inaudible tone changes, based on a location of the visitor.

4. The tone-emitting device of claim 3, wherein the non-transitory computer-readable medium stores logic that, when executed by the tone-determining computing device, causes the tone-determining computing device to encode the inaudible tone by:
selecting sounds corresponding to at least one pair of non-naturally occurring frequencies in a range between about 15 kHz and about 25 kHz;
assigning the sounds corresponding to the at least one pair of frequencies a unique character;
arranging the sounds to form the inaudible tone comprising a sequence of the unique characters; and
sending the at least a portion of the data with the inaudible tone.

5. The tone-emitting device of claim 3, wherein the tone-emitting device is a portable device configured to be moved from a first location to a second location.

6. The tone-emitting device of claim 3, wherein the inaudible tone that is sent by the tone-emitting device is received by a remote computing device, wherein the remote computing device decodes the inaudible tone and associated metadata to determine the characteristic of the object.

7. The tone-emitting device of claim 6 further comprising:
an accelerometer communicatively coupled with the tone-determining computing device, wherein the tone-emitting speaker outputs the inaudible tone in response to the accelerometer detecting presence of the remote computing device within a predetermined range of the tone-emitting device.

8. A system for communicating an inaudible tone, the system comprising:
a tone-emitting device comprising:
a tone-emitting speaker for emitting a first inaudible tone and a second inaudible tone;
a tone-determining computing device communicatively coupled to the tone-emitting speaker and comprising a non-transitory computer-readable medium that stores logic that, when executed by the tone-determining computing device, causes the tone-determining computing device to perform at least the following:
receive data related to a characteristic of an object, wherein the object includes a visitor in a medical facility and wherein the characteristic includes an identity of the visitor, facility access for the visitor, and medical details of the visitor;
encode the first inaudible tone that includes a first pair of non-naturally occurring frequencies and represents at least a portion of the data;
encode a second inaudible tone that that includes a second pair of non-naturally occurring frequencies and represents data related to of the facility access for the visitor;
send first instructions to the tone-emitting speaker for outputting the first inaudible tone, wherein the first inaudible tone is sent in response to receiving a user input to broadcast the medical data of the visitor and is received by a communication device, wherein the communication device must authenticate to receive access to a portion of the data for which the communication device or user of the communication device is authorized to receive, and wherein upon authenticating, the communication device decodes the portion of the data for which the communication device or user of the communication device is authorized to receive, wherein in response to the medical professional not being able to authenticate, deriving access to the medical data to the medical professional and providing a message to the medical professional that access to the medical data is denied; and
send second instructions to a tone-emitting speaker of the tone-emitting device for outputting the inaudible tone, wherein the second inaudible tone is received by a stationary device that determines whether, based on the characteristic, the visitor is granted access to a portion of the facility, and wherein the second inaudible tone changes, based on a location of the visitor.

9. The system of claim 8, wherein the non-transitory computer-readable medium stores logic that, when executed by the tone-determining computing device, causes the tone-determining computing device to encode the inaudible tone by:
selecting sounds corresponding to at least one pair of non-naturally occurring frequencies in a range between about 15 kHz and about 25 kHz;
assigning the sounds corresponding to the at least one pair of frequencies a unique character;
arranging the sounds to form the inaudible tone comprising a sequence of the unique characters; and
sending the at least a portion of the data with the inaudible tone.

10. The system of claim 8 further comprising:
a remote computing device for receiving the data from the tone-emitting device, the remote computing device comprising:
a receiver for receiving the inaudible tone;
an output device for outputting data to a user; and
a memory component that stores logic that, when executed by the remote computing device, causes the remote computing device to:
receive the inaudible tone from the receiver;
decode the data and associated metadata encoded in the inaudible tone; and
provide an output related to the data through the output device.

11. The system of claim 10, wherein the remote computing device includes at least one of the following: a cellular communication device, a user computing device, or a stationary device operated by a third party for reporting the data to the remote computing device.

12. The system of claim 10, wherein the tone-emitting device further comprises:
an accelerometer communicatively coupled with the tone-determining computing device, wherein the tone-emitting speaker outputs the inaudible tone in response to the accelerometer detecting presence of the remote computing device within a certain range of distance of the tone-emitting device.

13. The system of claim 8, wherein:
the tone-emitting device is configured as a mobile device;
the object includes a user; and
the data includes identity and location of the user when the user enters a predetermined location.

14. The system of claim 13, wherein:
the mobile device is a bracelet worn by the user;
the user is a medical patient;
the data includes medical details of the medical patient.

* * * * *